United States Patent
Michisaka et al.

(10) Patent No.: US 6,644,693 B2
(45) Date of Patent: Nov. 11, 2003

(54) SCOOTER TYPE VEHICLE

(75) Inventors: Susumu Michisaka, Saitama (JP); Hiroyasu Ota, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/132,182

(22) Filed: Apr. 26, 2002

(65) Prior Publication Data

US 2002/0166709 A1 Nov. 14, 2002

(30) Foreign Application Priority Data

May 11, 2001 (JP) ........................................ 2001-142219

(51) Int. Cl.[7] ........................... B62K 11/10; B62K 19/12
(52) U.S. Cl. ........................ 280/835; 180/219; 224/413
(58) Field of Search ............................. 280/834, 835, 280/830, 831; 180/219; 224/413

(56) References Cited

U.S. PATENT DOCUMENTS

| 4,721,178 A | * | 1/1988 | Ito ............................. 180/215 |
| 4,726,439 A | * | 2/1988 | Iwao et al. ................... 180/219 |
| 4,830,134 A | * | 5/1989 | Hashimoto ................... 180/219 |
| 5,433,286 A | * | 7/1995 | Kumamaru et al. ......... 180/219 |
| 2001/0028168 A1 | * | 10/2001 | Nakagawa ................... 280/830 |

FOREIGN PATENT DOCUMENTS

| JP | 03042389 A | * | 2/1991 | ............. B62J/35/00 |
| JP | 2000-313393 | | 4/2000 | |

* cited by examiner

Primary Examiner—Kevin Hurley
(74) Attorney, Agent, or Firm—Birch, Stewart, Kolasch & Birch, LLP

(57) ABSTRACT

A scooter type vehicle such as a motorcycle includes a fuel tank disposed between a pair of left and right side frames extending in the fore-and-aft direction. The fuel tank is covered by an undercover on its under side and by a footrest plate on its upper side. The undercover is inserted between the left and right side frames from above. Edges of the undercover are placed on the left and right side frames, and the fuel tank is stored in a storage recess on the undercover from above. Edges of the fuel tank are placed on the edges of the undercover, and the footrest plate is placed on the edges of the fuel tank. The left and right side frames can then support the undercover, the fuel tank, and the footrest plate with the present invention.

18 Claims, 19 Drawing Sheets

SCOOTER TYPE VEHICLE

CROSS-REFERENCES TO RELATED APPLICATIONS

This nonprovisional application claims priority under 35 U.S.C. §119(a) on Patent Application No. 2001-142219 filed in Japan on May 11, 2001, the entirety of which is herein incorporated by reference.

BACKGROUND OF THE INVENTION

1. Field of the Invention

The present invention relates to a scooter type vehicle, and more particularly to a scooter type vehicle including a container disposed under a step floor on which the driver places his/her feet.

2. Description of the Background Art

In vehicles such as scooters, one type of vehicle includes a container accommodated in the space surrounded by the step floor and the undercover. As one of scooter type vehicles in this construction, the one disclosed in Japanese Patent Laid-Open No. 313393/2000 under the title of "VEHICLE BODY FRAME FOR SCOOTER TYPE VEHICLES" (hereinafter, referred to as the "related art") describes one type of scooter type vehicle of the background art having this configuration. The entire contents of the foregoing patent document of the background art is herein incorporated by reference.

The aforementioned vehicle is, as shown in FIG. 5 of the same patent publication, characterized in that a vehicle body frame of a scooter type vehicle is constructed of a combination of the front frame 23 (the numerals are excerpted from the publication, hereinafter) and the rear frame 24. The front frame 23 is constructed of a combination of a pair of left and right floor supporting frame portions 271, 272 extending in the fore-and-aft direction.

As shown in FIG. 1, FIG. 22, and FIG. 23 of the above-identified patent publication, this scooter type vehicle is constructed in such a manner that the open-top dough box 133 is disposed between the left and right floor supporting frame portions 271, 272. The upper portion of the dough box 133 is covered by the step floor 41a secured on the floor supporting frame portions 271, 272 by bolts. The undercover 41c is covered on the floor supporting frame portions 271, 272 from below and secured with bolts, so that the floor supporting fame portions 271, 272, and the dough box 133 are covered by the undercover 41c. The dough box 133 is a storage member for storing a battery 143 and a radiator reserve tank 147.

In the aforementioned configuration of the background art, the step floor 41a and the undercover 41c are secured separately on the left and right floor supporting frame portions 271, 272 with bolts. Accordingly, fastening members are required for both the step floor 41a and the undercover 41c. For example, in order to secure a step floor 41a on the left and right floor supporting frame portions 271, 272, screw nuts 124, screw nut supporting members 125, and bolts 127 are required. On the other hand, in order to secure the undercover 41c on the left and right floor supporting frame portions 271, 272, undercover supporting members 126, 126, and sets of bolts and screw nuts 131, 132 are required.

Assembling the step floor 41a and the undercover 41c separately makes the mounting structure complex, and increases the number of parts to be assembled. The ease of assembly is thereby reduced and the cost of the product is increased. When cost reduction is a requirement for a scooter type vehicle, the aforementioned construction hinders cost reduction and complicates assembly.

SUMMARY OF THE INVENTION

The present invention overcomes the shortcomings associated with the background art and achieves other advantages not realized by the background art.

Accordingly, an object of the present invention is to provide a technology whereby the cost of scooter type vehicles may be reduced, particularly by improving the mounting structure of the step floor and the undercover.

These and other objects are accomplished by a scooter type vehicle having a vehicle body, the vehicle comprising an engine having at least one cylinder; a front and a rear wheel; a pair of left and right side frames extending in a longitudinal direction of the vehicle body; a container having an upper side and a lower side and being disposed between the pair of left and right side frames; an undercover having edges, the undercover covering the lower side of the container and being inserted between the left and right side frames from a position above the container, wherein the edges of the undercover are engaged with the left and right side frames; a footrest plate covering the upper side of the container, the left and right side frames supporting the undercover; and an edge of the container engaging the footrest plate, the container being sandwiched between the undercover and the footrest plate.

These and other objects are further accomplished by a vehicle frame for a scooter type vehicle, the vehicle frame comprising a pair of left and right side frames extending in a longitudinal direction of the vehicle frame; a container having an upper side and a lower side and being disposed between the pair of left and right side frames; an undercover having edges, the undercover covering the lower side of the container and being inserted between the left and right side frames from a position above the container, wherein the edges of the undercover are engaged with the left and right side frames; a footrest plate covering the upper side of the container, the left and right side frames supporting the undercover; and an edge of the container engaging the footrest plate, the container being sandwiched between the undercover and the footrest plate.

The three parts of the undercover, the container, and the step floor may be assembled to the left and right side frames in pile from above, the mounting structure for assembling these three parts may be simplified, the number of the parts to be assembled may be reduced, and the ease of assembling the above-identified configuration may be enhanced. Therefore, the cost of the scooter type vehicle may be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
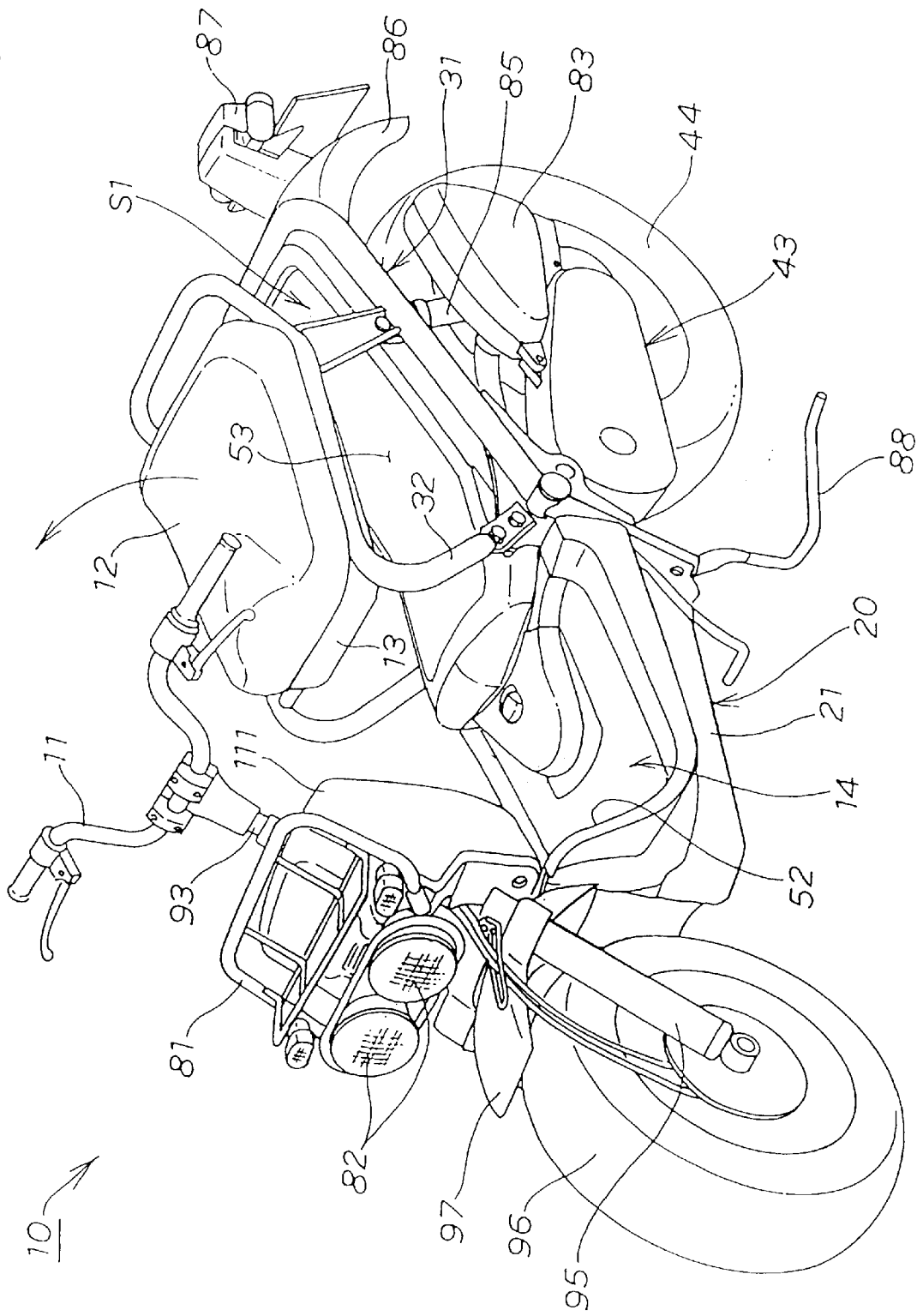
FIG. 1 is a perspective view of a scooter type vehicle according to the present invention.

The present invention will hereinafter be described with reference to the accompanying drawings. Referring now to the attached drawings, one embodiment of the present invention will be described hereinafter. The terms "front", "rear", "left", "right", "upper", and "lower" represent directions as viewed by the driver operating the vehicle shown in FIG. 1. The drawings are to be viewed in the direction in which the reference numerals may be seen in the right way.

FIG. 1 is a perspective view of a scooter type vehicle according to the present invention. The scooter type vehicle 10, in the embodiment shown in the accompanying figures, is a motorcycle or scooter including a handle 11, a seat 12 being capable of popping up as illustrated by the arrow, an under-the-seat tray 13 provided under the seat for being opened and closed by the seat 12, and a flat step floor 14 disposed between the handle 11 and the seat 12. A rear frame 31 is extended from the step floor 14 toward an upper rear direction. A supporting member 32 is set up from the rear frame 31 and the seat 12 is bridged over the upper end of the supporting member 32. An object storage space S1 enclosed by the seat 12 and the left portion and the right portion of the supporting members 32 is formed. In a preferred embodiment, the object storage space S1 is opened on the front, rear, left and right sides.

The step floor 14 is a footrest plate comprising a leg shield 52 extending upward from the front end integrally therewith, and a bottom plate 53 of the storage section extending from the rear end integrally therewith. The leg shield 52 is a member for covering/shielding the legs of the driver sitting on the seat 12 from a frontward direction.

Figure 2:
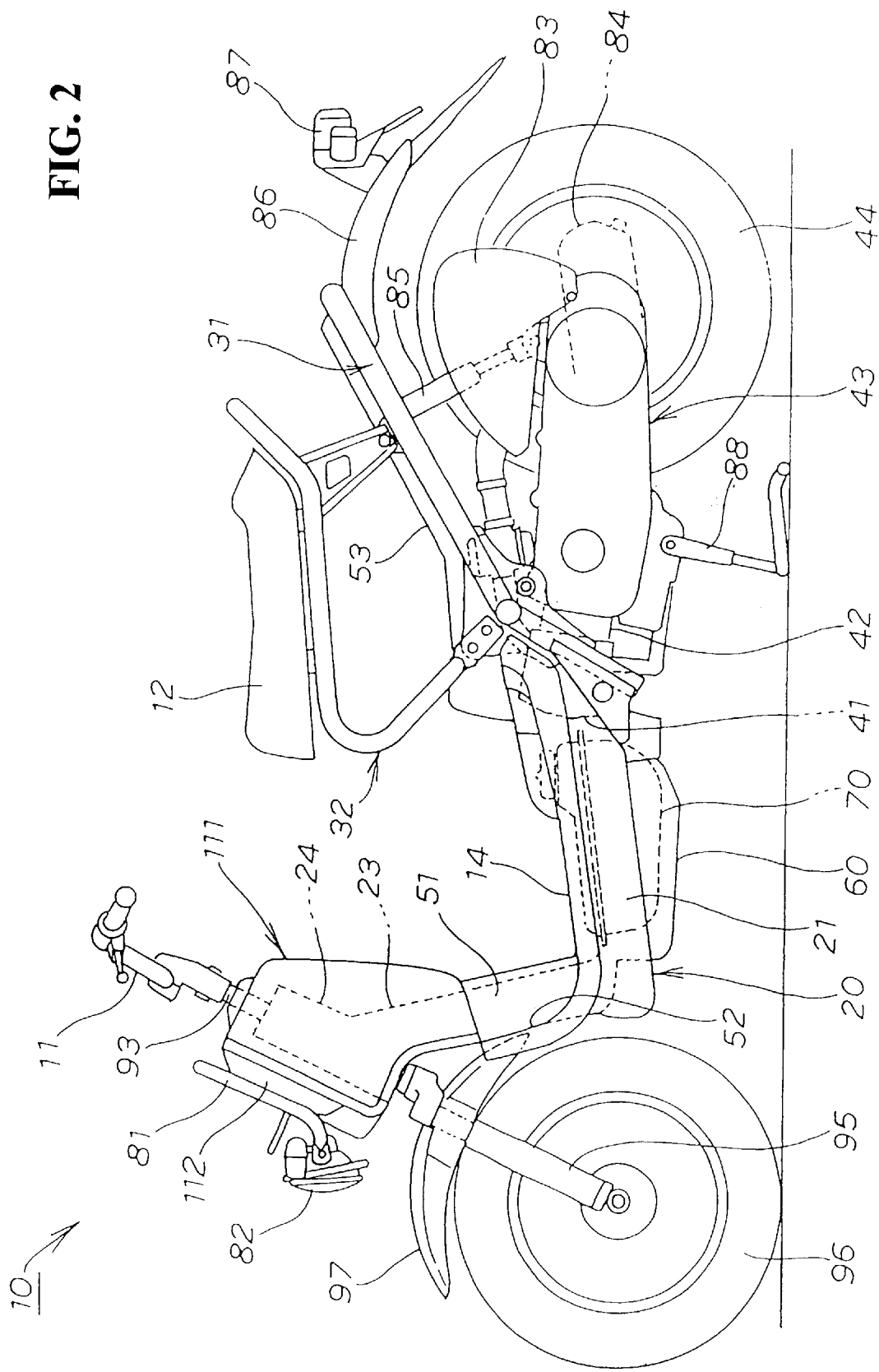
FIG. 2 is a side view of a scooter type vehicle according to the present invention.

FIG. 2 is a side view of a scooter type vehicle according to the present invention. FIG. 2 shows a state in which the vehicle body frame 20 (vehicle body) of the scooter type vehicle 10 is formed into a bi-frame including a front frame 21 having a front half and the rear frame 31. The rear frame 31 is secured to the rear end of the front frame 21 with bolt(s) and forms a rear half of the vehicle body. The scooter type vehicle 10 in such a construction is a two-wheeler in which a power unit 43 includes an engine 42 with an inverted cylinder 41 mountable for a swinging motion. The rear wheel 44 is driven by the power unit 43, an undercover 60 is disposed below the step floor 14, and a fuel tank 70 is stored in a space enclosed by the step floor 14 and the undercover 60. A headlamp supporting pipe 81 also serves as a front carrier. The vehicle also includes a headlamp 82, an air cleaner 83, a silencer 84, a rear cushion 85, and a rear fender 86. A tail lamp 87 and a stand 88 are also provided as shown in FIG. 2.

Figure 3:
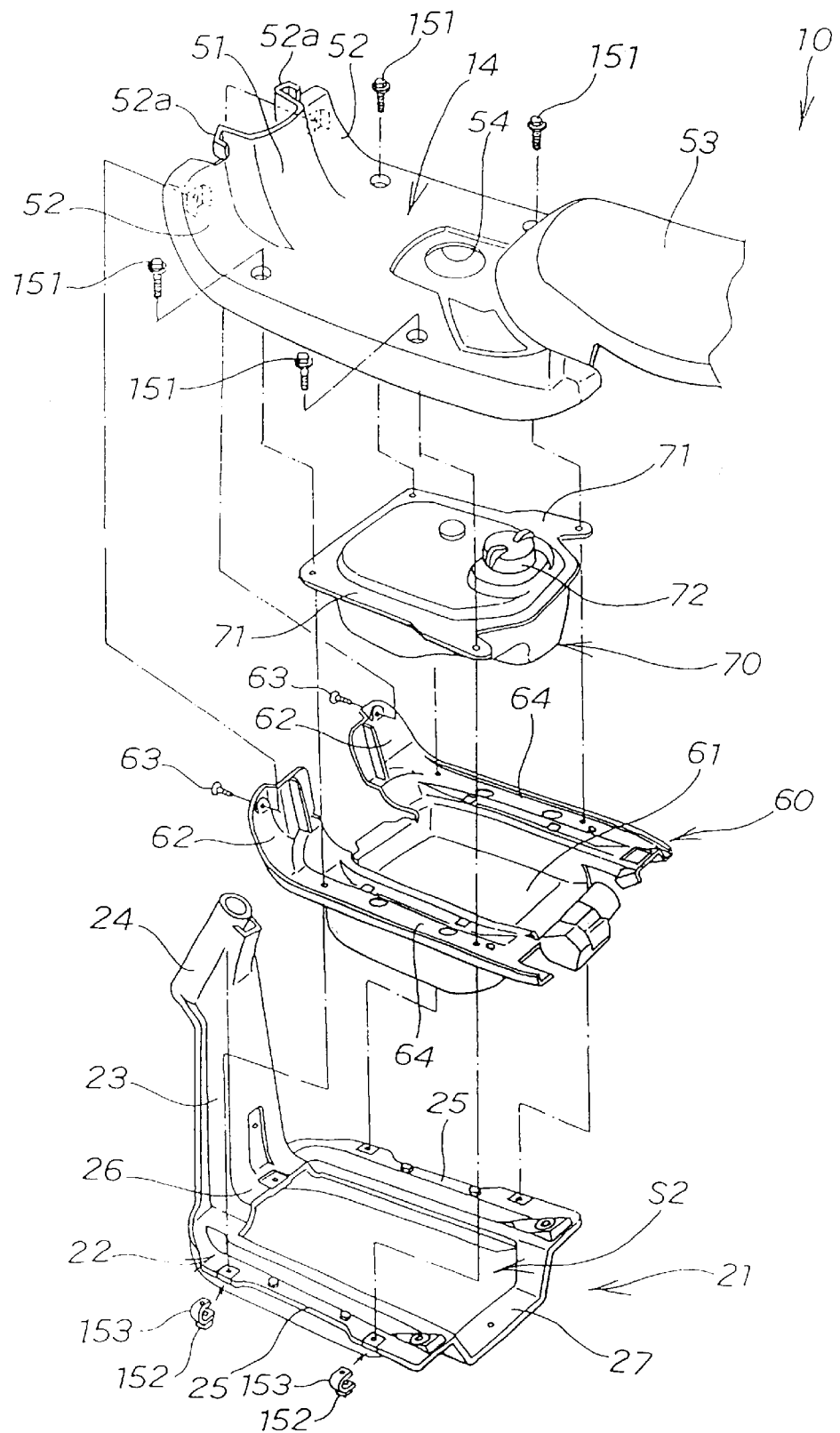
FIG. 3 is an exploded view of a front frame, a step floor, an undercover, and a fuel tank according to an embodiment of the present invention.

FIG. 3 is an exploded view of the front frame, the step floor, the undercover, and the fuel tank according to the present invention. The front frame 21 is a die-cast aluminum product including an elongated columnar front frame section 23 standing upward from the front of a center frame section 22. A head pipe 24 is provided on the front frame section 23.

The center frame section 22 is a frame body of square shape viewed in plan view including a pair of left and right side frames 25, 25 extending in the fore-and-aft direction. A front cross member 26 laid between the front ends of the left and right side frames 25, 25 and a rear cross member 27 laid between the rear ends of the left and right side frames 25, 25 formed substantially in a U-shape when viewed in a rear view are also provided in the center frame section 22. Since it is a square framed body, the center frame section 22 has a space S2 passing vertically through the center.

The step floor 14 includes an inner cover 51 in the shape of a letter U opening toward the front of the step floor 14 when viewed in a plan view. The inner cover 51 extends integrally and rises from the lateral center of the front end thereof. Left and right leg shields 52, 52 integrally extending upward from the left side and the right side of the front end of the inner cover 51 are connected with each other. The step floor 14 in this construction is a footrest plate supported by the front frame 21 by placing the left and right leg shields 52, 52 on both the left and right sides of the front frame section 23 from the rear of the vehicle body (front frame 21). The rear portion of the front frame section 23 is enclosed by the inner cover 51 when the inner cover is superposed onto the front frame 21.

The undercover 60 is a covering member supported by the front frame 21 by being disposed under the step floor 14 and superposed onto the front frame 21, e.g. in between the step floor 14 and the front frame 21. The undercover 60 in this construction includes an integrally formed storage recess 61 opening upward to be placed between the laterally extending pair of left and right side frames 25, 25, e.g., in the space S2 of the front frame 21. Left and right outer covers 62, 62 integrally extend upward from the left side and the right side of the front end. The left and right outer covers 62, 62 may be combined with the leg shields 52, 52 by being superposed on the front faces of the left and right leg shields 52, 52 and secured by screws 63, 63.

A fuel tank 70 as a container is disposed between the pair of left and right side frames 25, 25 extending in the fore-and-aft direction. The underside of the fuel tank 70 is covered by the undercover 60, and the upper side of the fuel tank 70 is covered by the step floor 14. More specifically, the scooter type vehicle 10 is characterized by a superposed supporting structure in which the under cover 60, the fuel tank 70, and the step floor 14 are supported by the left and right side frames 25, 25.

The undercover 60 is inserted between the left and right side frames 25, 25 from above, the edges 64, 64 of the undercover 60 placed on the left and right side frames 25, 25, the fuel tank 70 stored in the storage recess 61 of the undercover 60 from above, the edges 71, 71 of the fuel tank 70 placed on the edges 64, 64 of the undercover 60, and the step floor 14 is placed on the edges 71, 71 of the fuel tank 70.

Figure 4:
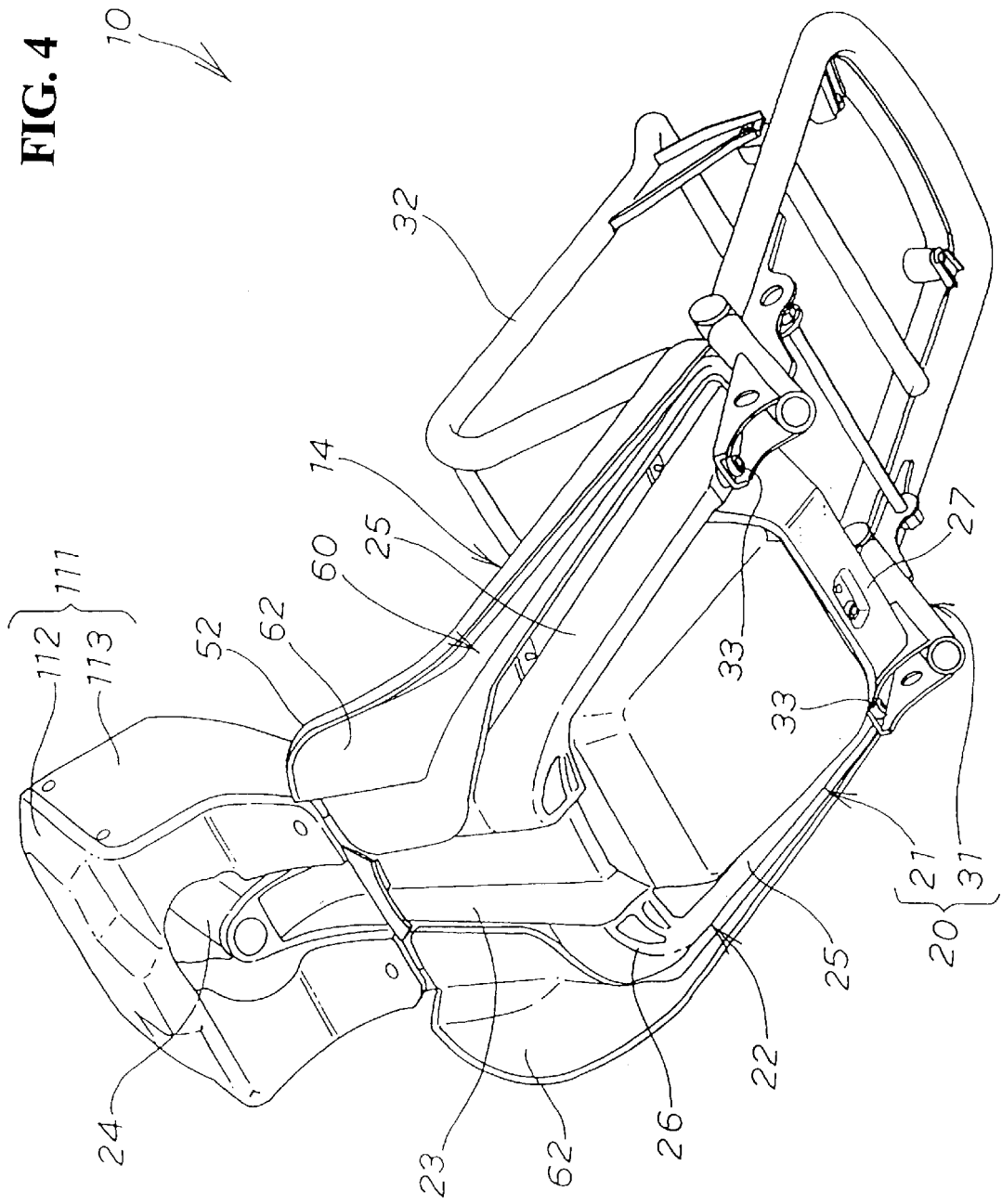
FIG. 4 is a perspective view of a portion of a scooter type vehicle according to the present invention.

FIG. 4 is a perspective view of a portion of the scooter type vehicle according an embodiment of the present invention. The relationship between the step floor 14, the vehicle body frame 20, the undercover 60, and electrical component box 111 in the scooter type vehicle 10 is seen as viewed from the lower front of the vehicle body. FIG. 4 also shows that the front end of the rear frame 31 is connected to the rear ends of the left and right side frames 25, 25 of the front frame 21 with bolts 33. One of skill in the art will recognize that some parts are not shown in this figure in the interest of clarity.

Figure 5:
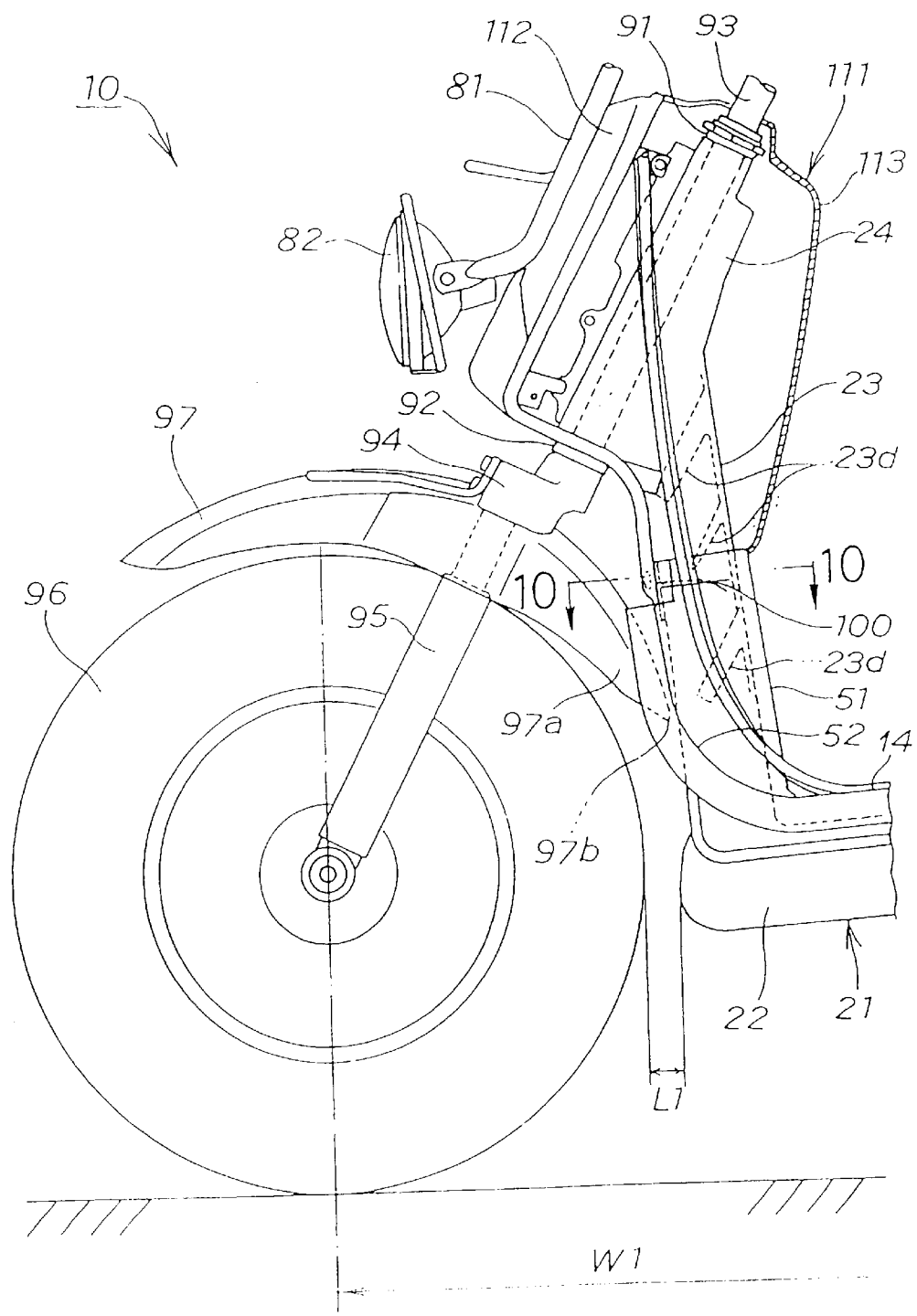
FIG. 5 is a side view of a front half of a scooter type vehicle according to the present invention.

FIG. 5 is a side view of a front half of the scooter type vehicle according to an embodiment of the present invention. The scooter type vehicle 10 includes a steering shaft 93 rotatably mounted in the head pipe 24 via the upper and lower bearings 91, 92. The handle 11 (See FIG. 1) is mounted on the upper end of the steering shaft 93, the front wheel 96 is rotatably mounted on the lower end of the steering shaft 93 via the bridge 94 and the front fork 95, and a front fender 97 is mounted on the front fork 95. The front wheel 96 may be steered by the steering shaft 93, and an upper portion of the front wheel 96 may be covered by the front fender 97.

The front fender 97 includes a relatively small covering member having the rear end portion 97a placed at a high position with respect to the wheel. More specifically, the rear end 97b of the front fender 97 (that is, the lower rear end) is set at a height about one-third from the bottom of the lengthwise portion of the center frame section 22 to the head pipe 24, or approximately the entire length of the front frame section 23.

Since the rear end portion 97a of the front fender 97 is not placed as low as the center frame section 22, the rear end portion 97a is not situated between the center frame section 22 and the front wheel 96. Therefore, the distance L1 from the front end of the center frame section 22 to the front wheel 96 may be reduced correspondingly and the front wheel 96 may still be shifted rearward. As a consequence, the distance W1 from the front wheel 96 to the rear wheel 44 (See FIG. 2), e.g. the wheel base W1, may be reduced. Accordingly, the design freedom for the scooter type vehicle 10 is significantly increased.

A mud shielding member 100 is disposed at a higher level than the rear end 97b of the front fender 97 and on the front frame section 23. More specifically, the mud shielding member 100 is disposed on the front face of the front frame section 23. The mud shielding member 100 is a member for preventing mud splashed by the front wheel 96 from heading to and/or contaminating the lower bearing 92 for supporting the steering shaft. An electrical component box 111 is mounted on the head pipe 24, and the electrical components such as a battery, an engine control unit, or the like (not shown), can be stored in the electrical component box 111.

The electrical component box 111 includes a front face board 112 mounted on the front portion of the head pipe 24, and a special cover 113 mounted on the rear portion of the front face board 112 so as to enclose the head pipe 24. A headlamp supporting pipe 81 may be mounted on the front face of the front face board 112.

Figure 6:
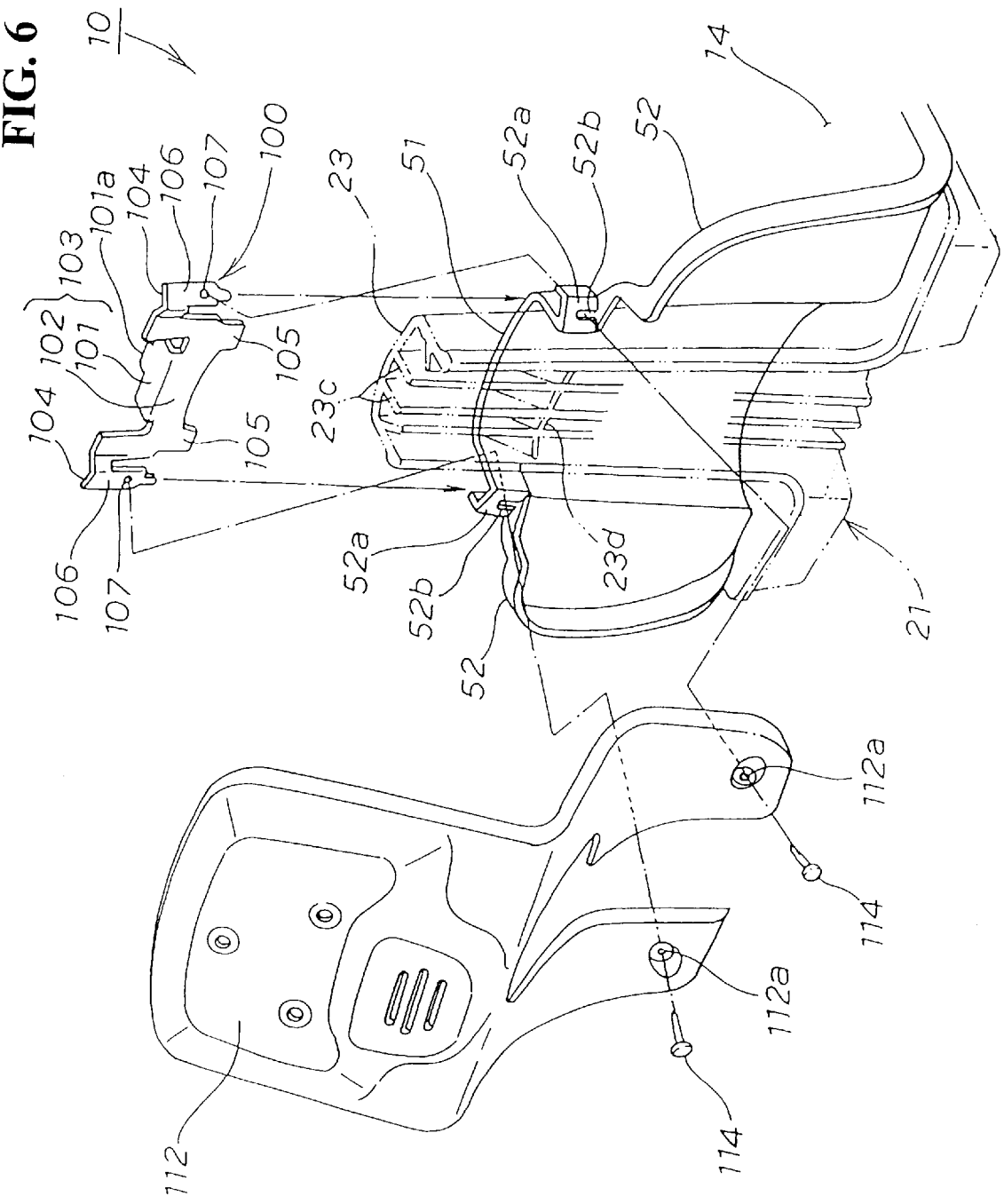
FIG. 6 is an exploded view of leg shields, a mud shielding member, and a front face board according to an embodiment of the present invention.

FIG. 6 is an exploded view of leg shields, the mud shielding member, and the front face board according to an embodiment of the present invention. The left and right leg shields 52, 52 form flanges 52a, 52a extending toward the left and the right at the upper front end of the leg shields 52. The flanges 52a, 52a include screw holes 52b, 52b passing therethrough in the fore-and-aft direction.

The mud shielding member 100 is a single piece formed by bending a steel plate produced by forming a mud shielding portion 103 in the shape of a reversed letter L when viewed in a side view. The mud shielding member 100 includes a substantially horizontal plate 101 and a vertical plate 102 extending downward from the front end of the horizontal plate 101, extending hooking arms 104, 104 in the shape of an inverted U when viewed in a front view upward from the upper left portion and the upper right portion of the vertical plate 102, and holding leg strips 105, 105 extending downward from the lower left portion and the lower right portion of the vertical plate 102. The hooking arms 104, 104 are formed with screw holes 107, 107 passing through (in a fore and aft direction) the hooking portions 106, 106 that extend downward on the laterally outer sides.

The leg shields 52, 52 are provided on the left and right sides of the front frame section 23 shown in phantom, and the mud shielding member 100 is superposed on the front face of the leg shields 52, 52. The left and right leg shields 52, 52 are connected by the mud shielding member 100. More specifically, the left and right leg shields 52, 52 are extended from the rear of the vehicle body on both the left and right sides of the front frame section 23. The mud shielding member 100 is moved downward from above the front of the front frame section 23 and the hooking portions 106, 106 are inserted to the back sides of the flanges 52a, 52a. The holding legs 105, 105 are inserted into the front sides of the leg shields 52, 52.

Subsequently, the front face board 112 is superposed on the front face of the mud shielding member 100 from the front, and the screw holes 112a, 112a of the front face board 112, the screw holes 52b, 52b of the flanges 52a, 52a, and the screw holes 107, 107 of the hooking portions 106, 106 are aligned and secured with the screws 114, 114. Accordingly, the mud shielding member 100 may be mounted on the leg shields 52, 52 by detachably connecting the mud shielding member 100 between the front end portions of the left and right leg shields 52, 52.

The left and right leg shields 52, 52 may be reinforced and enhanced in rigidity by connecting the left leg shield 52 and the right leg shield 52. Since the mud shielding member 100 also serves as a reinforcing member for the left and right leg shields 52, 52, a separate member for reinforcing the leg shields 52, 52 is not necessary. In addition, this arrangement improves the ease of assembly of the left and right leg shields 52, 52.

Figure 7:
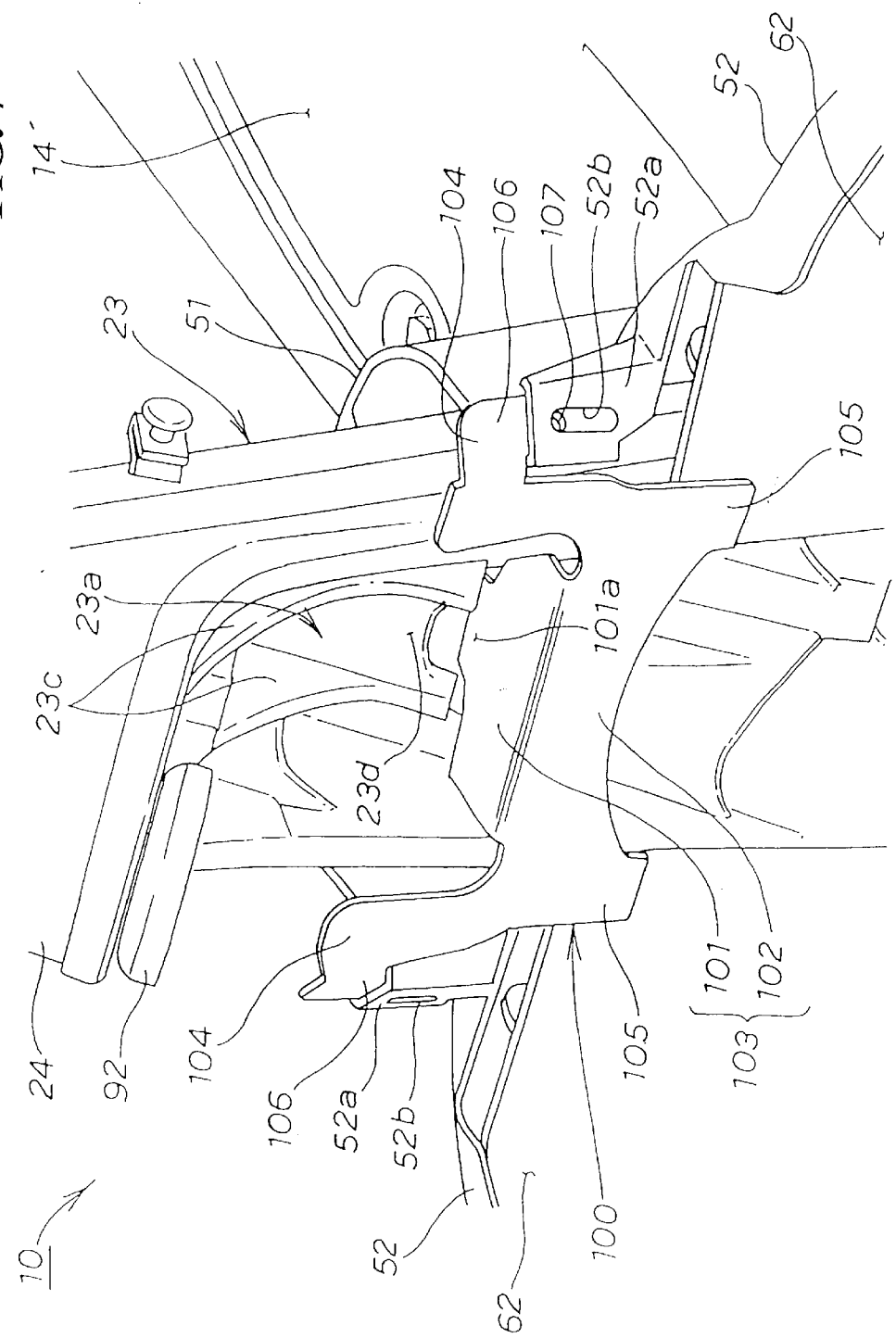
FIG. 7 is a perspective view showing a mounting structure of the mud shielding member according to an embodiment of the present invention.

FIG. 7 is a perspective view showing the mounting structure of the mud shielding member according to the present invention. The mud shielding member 100 is mounted on the left and right leg shields 52, 52 when viewed from the upper front. One of skill in the art will appreciate that some parts have been omitted from the figure in the interest of clarity. By supporting the back face of the flanges 52*a*, 52*a* with hooking portions 106, 106 and supporting the front face of the leg shields 52, 52 with the holding legs 105, 105 via the outer covers 62, 62, the leg shields 52, 52 may be captured by the mud shielding member 100 for temporary fixation before tightening the bolts.

Figure 8:
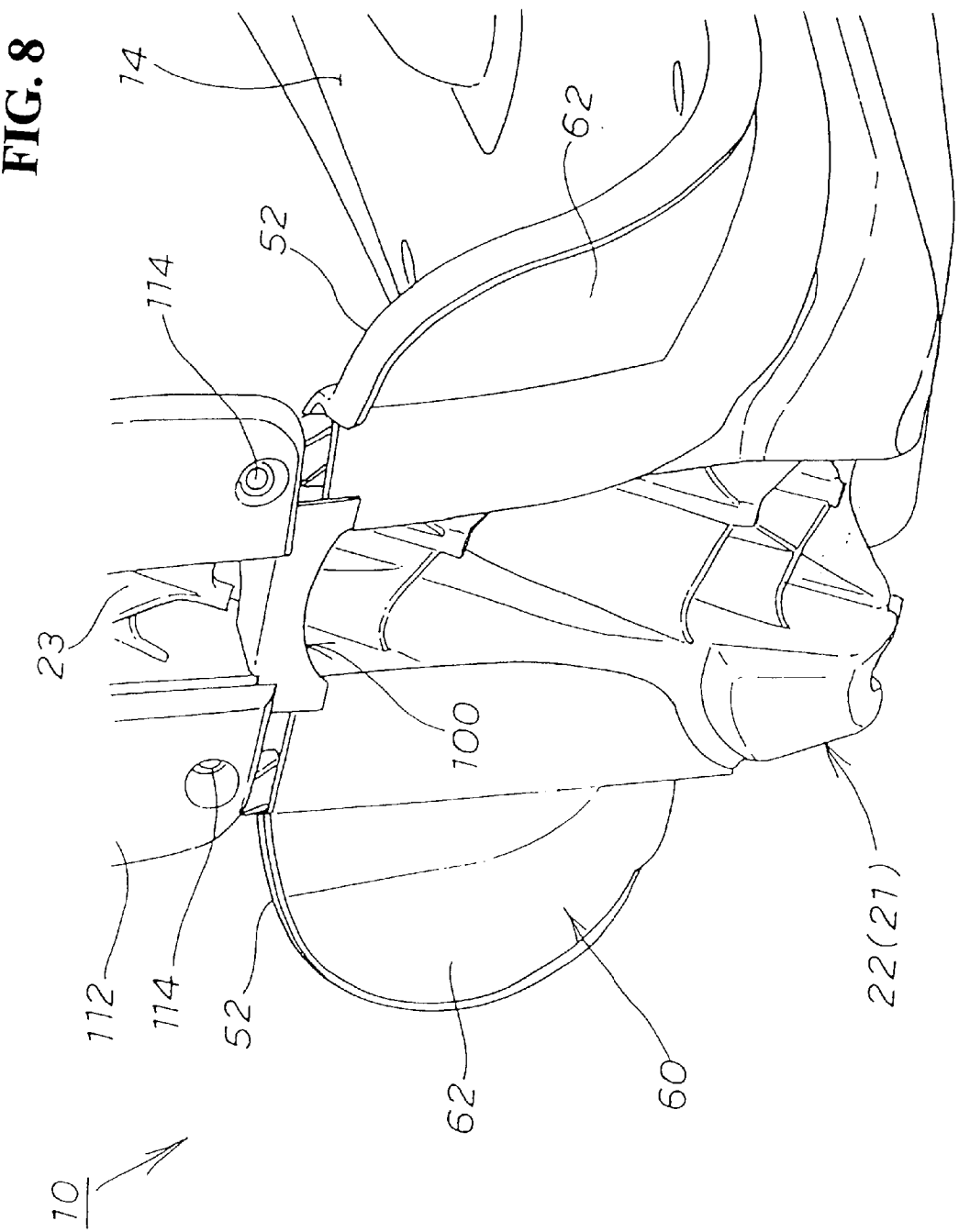
FIG. 8 is a perspective view showing a mounting structure of the mud shielding member and the front face board according to an embodiment of the present invention.

FIG. 8 is a perspective view showing the mounting structure of the mud shielding member and the front face board according to the present invention. The front end portions of the left and right leg shields 52, 52 are connected by the mud shielding member 100 by securing the mud shielding member 100 and the front face board 112 to the left and right leg shields 52, 52 with the screws 114, 114. One of skill in the art will appreciate that some parts have been omitted from the figure in the interest of clarity.

Figure 9:
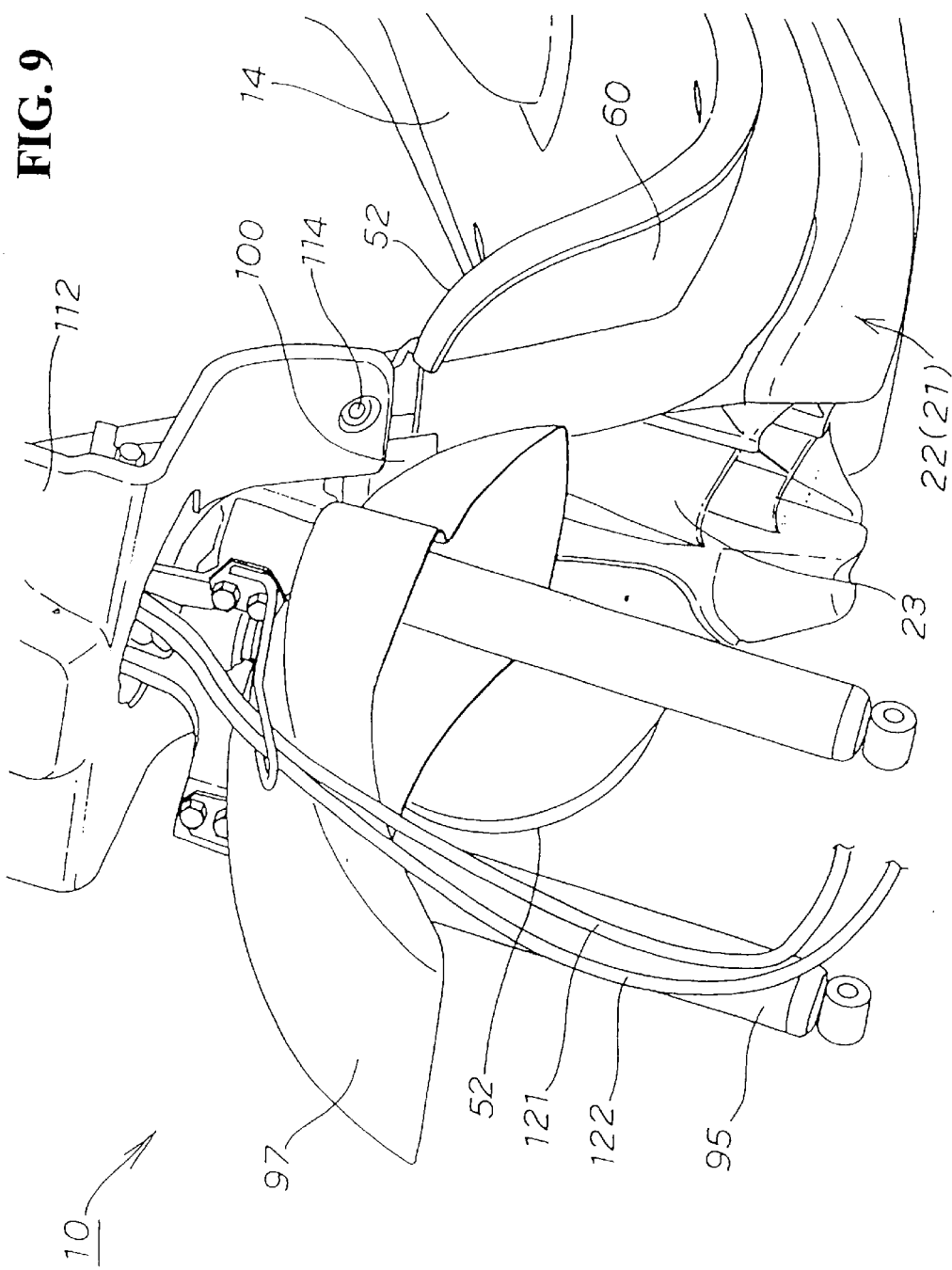
FIG. 9 is a perspective view of a portion of an upper front portion of the scooter type vehicle according to an embodiment of the present-invention.

FIG. 9 is a perspective view of a portion of the upper front portion of the scooter type vehicle according to the present invention. The front frame section 23, the left and right leg shields 52, 52, the undercover 60, the front fender 97, the mud shielding member 100, and the front face board 112 are shown as viewed from the lower front. One of skill in the are will appreciate that some parts have been omitted from the figure in the interest of clarity. A front brake cable 121 and a cable for the speedometer 122 are also shown.

Figure 10:
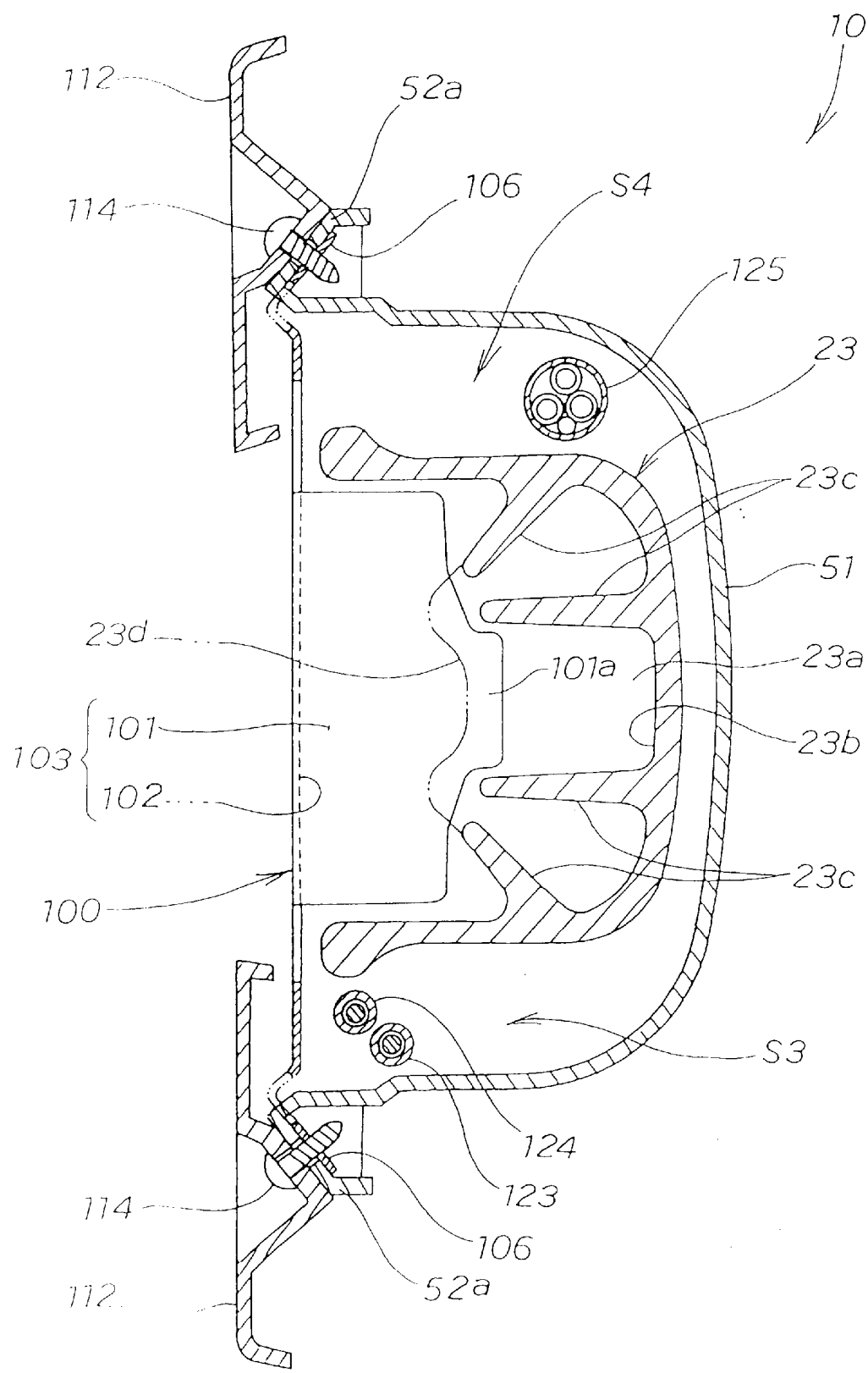
FIG. 10 is a cross sectional view taken along the line 10—10 in FIG. 5.

FIG. 10 is a cross sectional view taken along the line 10—10 in FIG. 5. The front frame section 23 is formed into a substantially U shape opening toward the front when viewed in cross section. The horizontal plate 101 of the mud shielding member 100 is inserted into the groove 23*a* of the front frame section 23.

The front frame section 23 includes four longitudinal ribs 23*c* extending from the bottom 23*b* of the groove 23*a* toward the front (left of the figure) and a plurality of lateral ribs 23*d* (See FIG. 5) as a single piece. The lengths of the four longitudinal ribs 23*c* are approximately one half of the depth of the groove. The front ends of the lateral ribs 23*d* extend forwardly of the front ends of the longitudinal ribs 23*c*.

On the other hand, the lateral width of the horizontal plate 101 is slightly smaller than the width of the groove 23*a*, and the depth of the horizontal plate 101 is such that the front end 101*a* thereof reaches almost the front ends of the longitudinal ribs 23*c* in a position where the front end is inserted into the groove 23*a*. By inserting the horizontal plate 101 into the groove 23*a*, the front half of the groove 23*a* may be divided into the upper portion and the lower portion (front side and reverse side of the figure). In addition, the front end portions 101*a* of the lateral ribs 23*d* and the front end of the horizontal plate 101 overlap one another.

The inner cover 51 is substantially U-shaped when viewed in cross section and formed so as to enclose the left and right sides and rear side of the front frame section 23 with a space interposed therebetween. A throttle cable 123 and the rear brake cable 124 may be passed through the space S3 formed between the left side wall of the front frame section 23 and the left side wall of the inner cover 51. A wire harness 125 may be passed through the space S4 between the right side wall of the front frame section 23 and the right side wall of the inner cover 51. Therefore, by passing the throttle cable 123, rear brake cable 124, and the wire harness 125 through the inner cover 51, these relatively fragile, linear members 123–125 may be protected.

Figure 11:
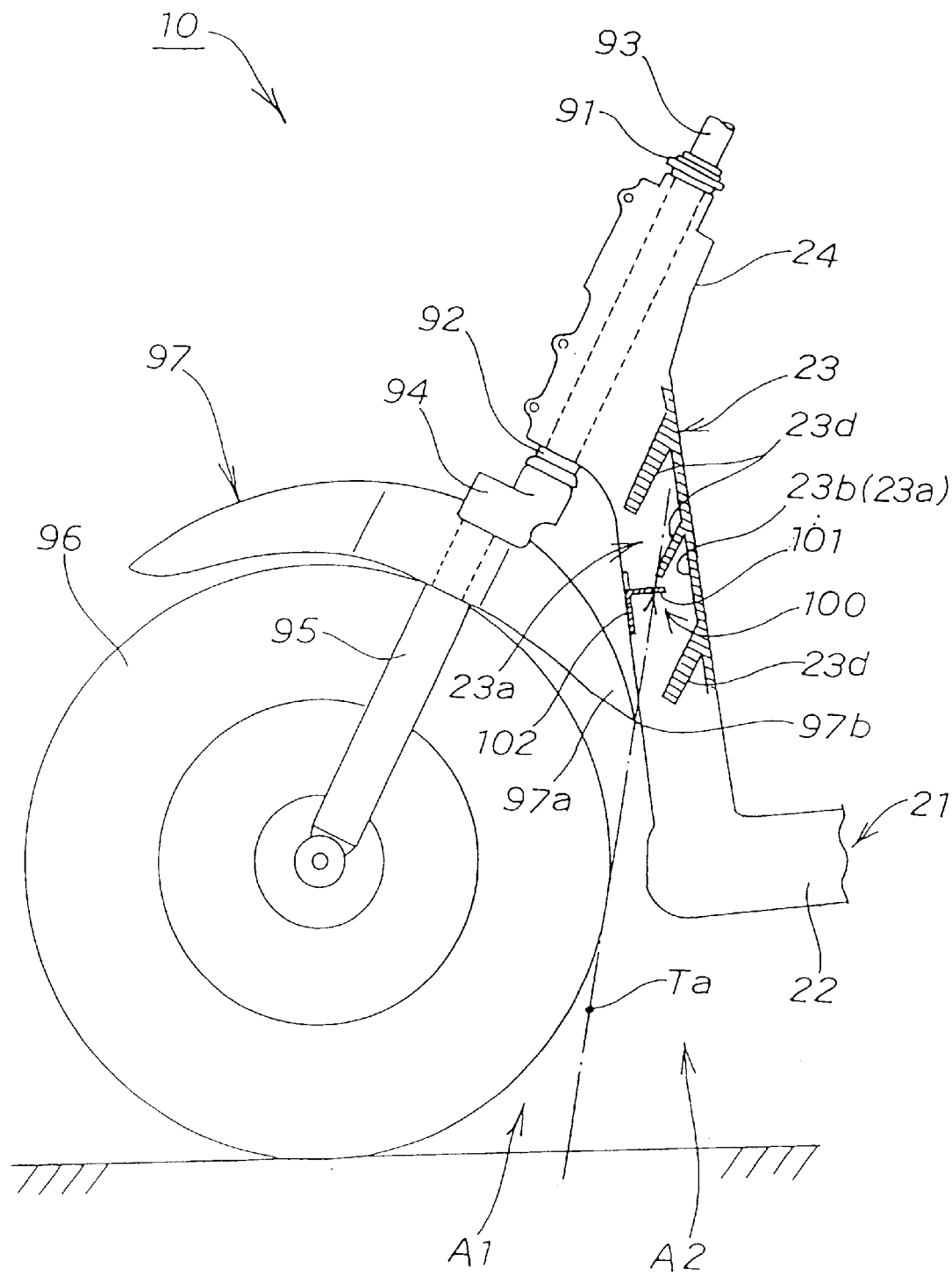
FIG. 11 is a partial, side view showing the action of the mud shielding member according to an embodiment of the present invention.

FIG. 11 is a side view showing the action of the mud shielding member according to the present invention. The straight line Ta being in contact with the rear end 97*b* of the front fender 97 and with the outer peripheral surface of the rear portion of the front wheel 96 is referred to as "mud splash boundary Ta." In the area A1 forward of the mud splash boundary Ta, mud splashed by the front wheel 96 is blocked by the front fender 97, and thus cannot head for the lower bearing 92 for supporting the steering shaft. On the other hand, in the area A2 rearward of the mud splashing boundary Ta, mud splashed by the front wheel 96 strikes onto and splashes rearward from the front portion of the front frame section 23, and thus can head for the lower bearing 92.

Accordingly, the mud shielding member 100 for preventing mud splashed by the front wheel 96 from heading for the bearing 92 is provided on the front frame section 23 at a level higher than the rear end 97*b* of the front fender 97. More specifically, the horizontal plate 101 of the mud shielding member 100 is disposed on the mud splashing boundary Ta at the level higher than the rear end 97*b* of the front fender 97. The mud shielding member 100 is simultaneously at a position to block the course of mud splashed by the front wheel 96 and splashing off the front portion of the front frame section 23 toward the bearing 92.

Furthermore, the front frame section 23 includes a plurality of lateral ribs 23*d* extending from the bottom 23*b* of the groove 23*a* toward the lower front, with each rib disposed above one another. The mud shielding member 100 is disposed in such a manner that the front end of the horizontal plate 101 and the front end of at least one of these lateral ribs 23*d* overlap one another with some amount of space interposed therebetween. By overlapping the lateral rib 23*d* and the horizontal plate 101 one on top of another, a labyrinth effect is expected. Accordingly, mud does not pass through such the amount of space between the lateral rib 23*d* and the horizontal plate 101. The size of the space and the presence of the space are discretionary.

When mud splashed by the front wheel 96 strikes onto the lower surface of the horizontal plate 101, mud is guided back downward. When mud strikes onto the front portion of the front frame section 23, e.g., onto the interior of the groove 23*a* or onto the vertical rib 23*c*, the mud strikes onto the lower surface of the horizontal plate 101, the back surface of the vertical plate 102, or the lower surface of the lateral rib 23*d* and splashes downward. When splashed mud strikes onto the lateral rib 23*d*, the mud strikes on the lower surface of the horizontal plate 101, the back surface of the horizontal plate 102, and the lower surface of other lateral ribs 23*d*, and is then guided downward. Accordingly, even when the rear end portion 97*a* of the front fender 97 is placed at the high level, mud splashed by the front wheel 96 is prevented from heading toward the bearing 92 for supporting the steering shaft.

Figure 12:
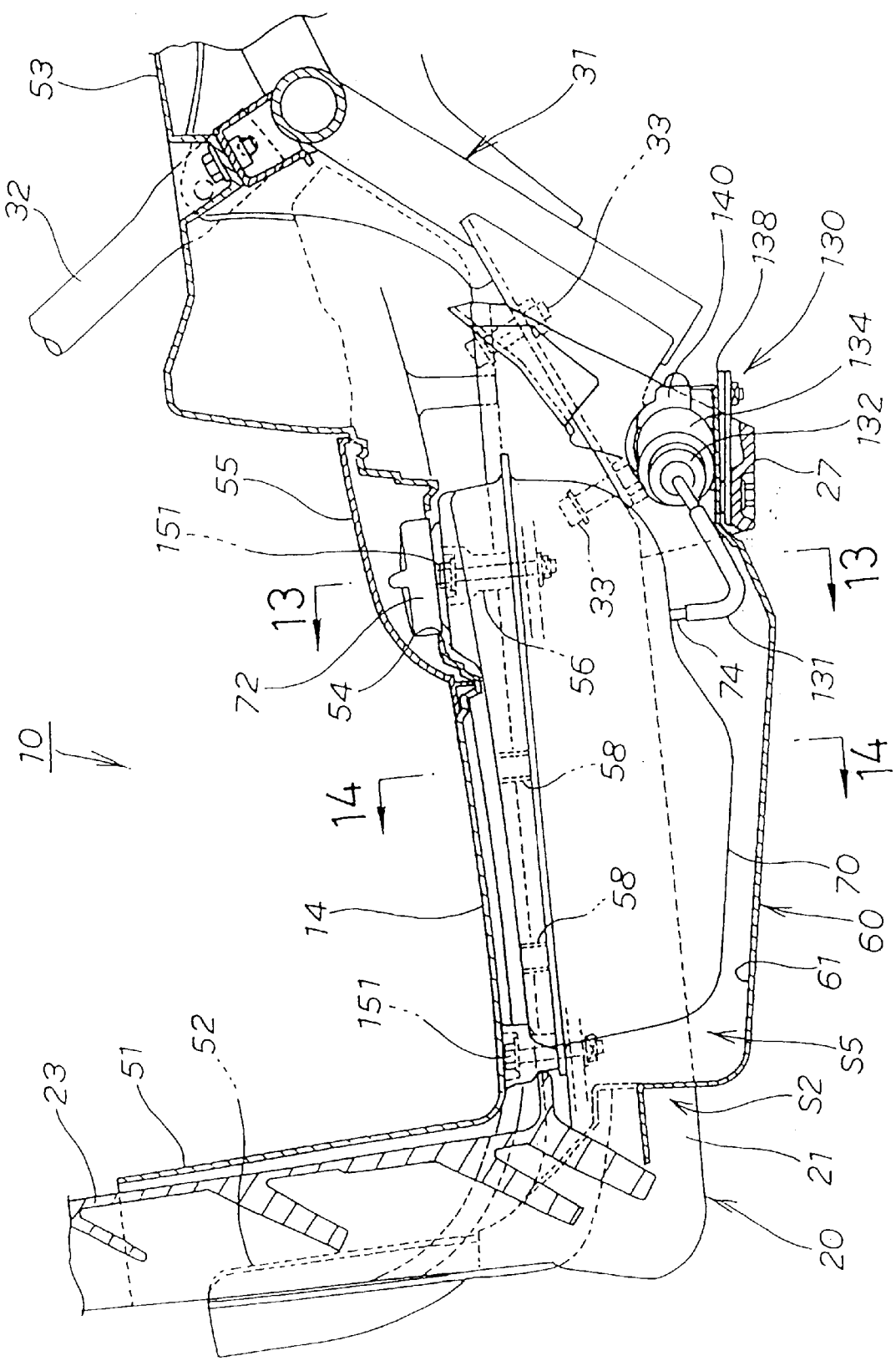
FIG. 12 is a left side cross sectional view showing an area of the scooter type vehicle around the vehicle body frame, the step floor, the undercover, and the fuel tank.

FIG. 12 is a left side cross sectional view showing an area of the scooter type vehicle around the vehicle body frame, the step floor, the undercover, and the fuel tank. The storage recess 61 is disposed in the space S2 in the front frame 21, the step floor 14 is placed on the storage recess 61, and the fuel tank 70 is disposed in the space enclosed by the step floor 14 and the storage recess 61.

Since the storage recess 61 is disposed below the step floor 14, the container such as the fuel tank 70, dough box, or the like may be disposed effectively utilizing the free space below the step floor 14. This figure further shows that a opened portion 54 is formed on the rear portion of the step floor 14 so as to pass vertically therethrough. A lid 55 for the oil/fuel filler port for opening and closing the opened portion 54 on the step floor 14 so that the oil filler cap 72 of the fuel tank 70 is exposed from the opened portion 54 when the lid 55 for the oil filler port is opened. The oil filler cap 72 in a state in which the oil filler port of the fuel tank 70 is closed projects upward from the upper surface of the step floor 14. Therefore, the lid 55 for the oil filler port has an upwardly swelled configuration.

The fuel system 130 including the fuel filter 132 and the fuel pump 134 is disposed at a position near the cylinder 41 of the engine 42, shown in FIG. 2 described above, within the space S5 enclosed by the undercover 60 for covering and protecting the bottom portion of the fuel tank 70 and the step floor 14. Therefore, the fuel system 130, including the fuel filter 132 and the fuel pump 134, is covered by a heat shielding plate 140 so as not to be influenced by heat from the engine 42, which is at relatively high temperature. Details about the heat shielding plate 140 will be described hereinafter.

Figure 13:
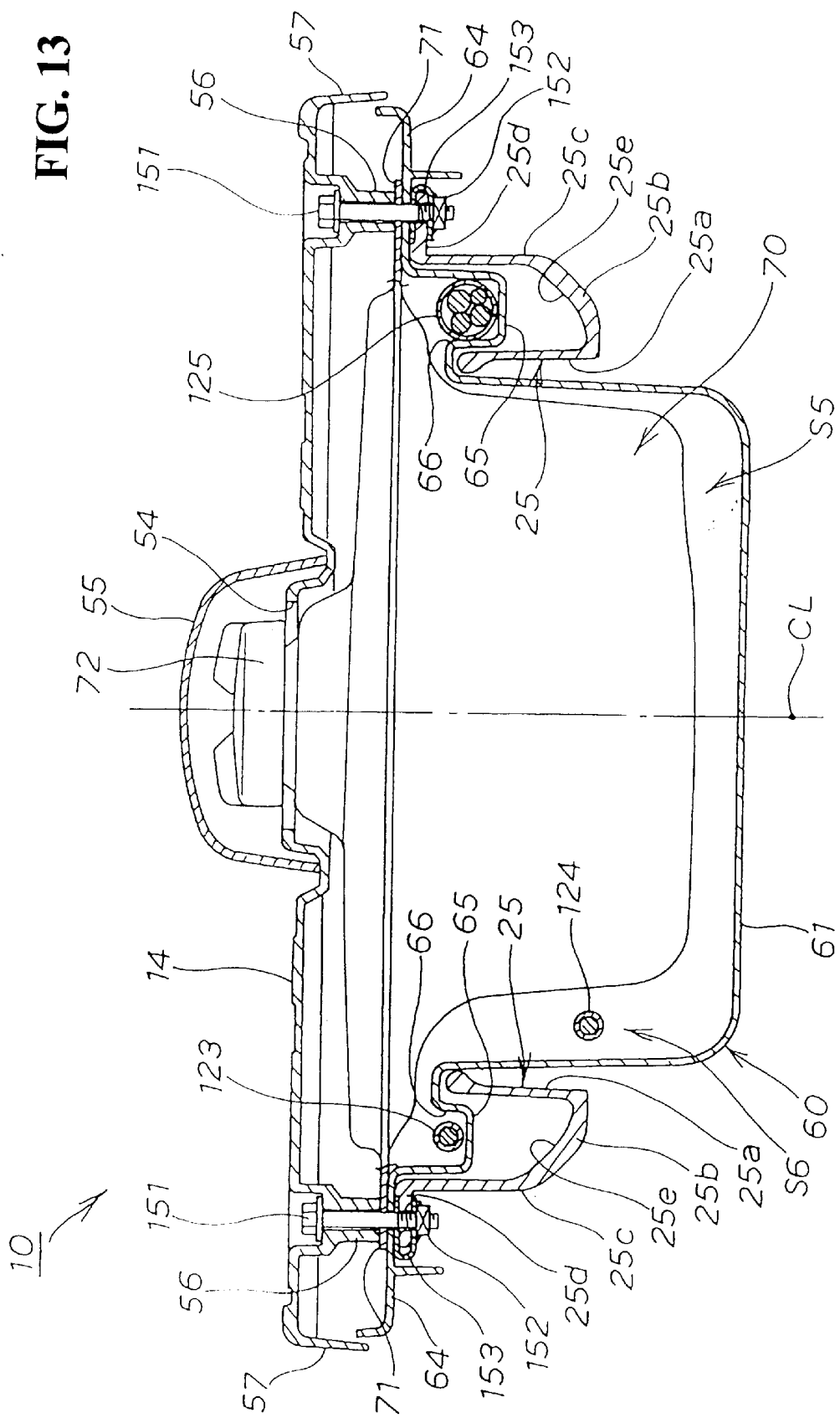
FIG. 13 is a cross sectional view taken along the line 13—13 in FIG. 12.

FIG. 13 is a cross sectional view taken along the line 13—13 in FIG. 12. The left and right side frame 25, 25 is a member in the shape of a letter U in back view provided with open-top grooves 25e, 25e extending in the fore-and-aft direction (front side and reverse side of the figure).

More specifically, the left side frame 25 is a single piece member including an inner uprising wall 25a located inner side of the vehicle body, a horizontal wall 25b extending from the lower end of the inner uprising wall 25a outward of the vehicle body, an outer uprising wall 25c located outer side of the vehicle body extending upward from the outer end of the horizontal wall 25b, and an edge 25d (flange 25d) extending horizontally outwardly of the vehicle body from the upper end of the outer uprising wall 25c. The upper end of the inner uprising wall 25a is lower then the edge 25d. The space enclosed by the inner uprising wall 25a, the horizontal wall 25b, and the outer uprising wall 25c is a groove 25e.

The right side frame 25 is a member symmetrical with the left side frame 25 with respect to the centerline CL of the vehicle body extending through the center of the vehicle body. The undercover 60 includes integrally formed edges 64, 64 (flanges 64, 64) extending horizontally outward of the vehicle body. The undercover also includes swelled portions 65, 65, shaped like a letter U when viewed in a rear view, extending in the fore-and-aft direction (front side and reverse side of the figure) and integrally formed with the edges 64, 64.

Since the swelled portions 65, 65 are substantially U shaped, the swelled portions include open-top elongated recesses 66, 66 extending in the fore-and-aft direction (front side and reverse side of the figure). A linear member such as a throttle cable 123, a wire harness 125 or the like may be passed through the recesses 66, 66. The step floor 14 is a generally flat member including bosses 56 extending downward from the left side and the right side of the lower surface, and edges 57, 57 extending downward from the left and right ends. Accordingly, these edges 57, 57 are fitted over the edges 64, 64 of the undercover 60.

The figure shows that the edges 71, 71 of the side frames 25, 25, the edges 64, 64 of the undercover 60, the edges 71, 71 of the fuel tank 70, and the step floor 14 are superposed, e.g. in a sandwiched configuration, in succession by placing the edges 64, 64 of the undercover 60 on the edges 25d, 25d of the left and right side frame 25, 25. The edges 71, 71 of the fuel tank 70 are placed on the edges 64, 64 of the undercover 60 and the step floor 14 is placed on the edges 71, 71 of the fuel tank 70 to abut the bosses 56 of the step floor 14 thereon. All of these members are then joined by tightening the nuts 152 and bolts 151 passed through the bosses 56 in the vertical direction. In this manner, the undercover 60, the fuel tank 70, and the step floor 14 are supported by the left and right side frames 25, 25 and receive their loads satisfactorily.

In addition, three parts of the undercover 60, the fuel tank 70, and the step floor 14 may be assembled in this order in pile on the left and right side frames 25, 25. The mounting structure of these three parts 60, 70, and 14 may be simplified, the number of parts to be assembled may be reduced, and the assembling property may be enhanced. For example, as shown in FIG. 3 described hereinabove, the three parts 60, 70, and 14 must only be secured to the left and right side frames 25, 25 with four pairs of nuts 152 and bolt 151.

Since the three parts 60, 70, and 14 may be combined with each other only by superposing them on the left and right side frames 25, 25 from above, modular assembly is optimized and the design of the vehicle frame and vehicle is enhanced/simplified. Accordingly, the cost of the scooter type vehicle 10 may be reduced.

As described above, the undercover 60 has a construction in that the substantially horizontal edges 64, 64 are superposed on the left and right side frames 25, 25 with other parts from above, and combined with the nuts 152 and bolts 151 in the vertical direction. Therefore, the thickness of the undercover 60 may be reduced in comparison with the combining structure in which the parts are secured to the side frames 25, 25 with bolts from the sides as in the background art. Therefore, when the portion around the step floor 14 is viewed from the side, it is slim in appearance, and the appearance/profile of the scooter type vehicle 10 may be enhanced.

In addition, the undercover 60 may easily be positioned with respect to the left and right side frames 25, 25 only by fitting the swelled portions 65, 65 provided on the edges 64, 64 of the undercover 60 in the fore-and-aft direction in the open-top grooves 25e, 25e provided on the left and right side frames 25, 25 in the fore-and-aft direction. Therefore, the assembling property may further be enhanced. In addition, no additional positioning member is required.

The nut 152 may be positioned in the step floor 14 by inserting the clip 153 attached with a nut 152 into the edge 25d of the step floor 14. Whether or not the clip 153 is used is discretionary. The storage recess 61 is disposed on the right side or the left side of the centerline CL of the vehicle body as in the figure. Since arrangement of the storage recess 61 on the right side or the left side creates a space S6 between the side frame 25 and the side of the storage recess 61, the linear member such as the rear brake cable 124 or the like may be passed through the space S6.

Figure 14:
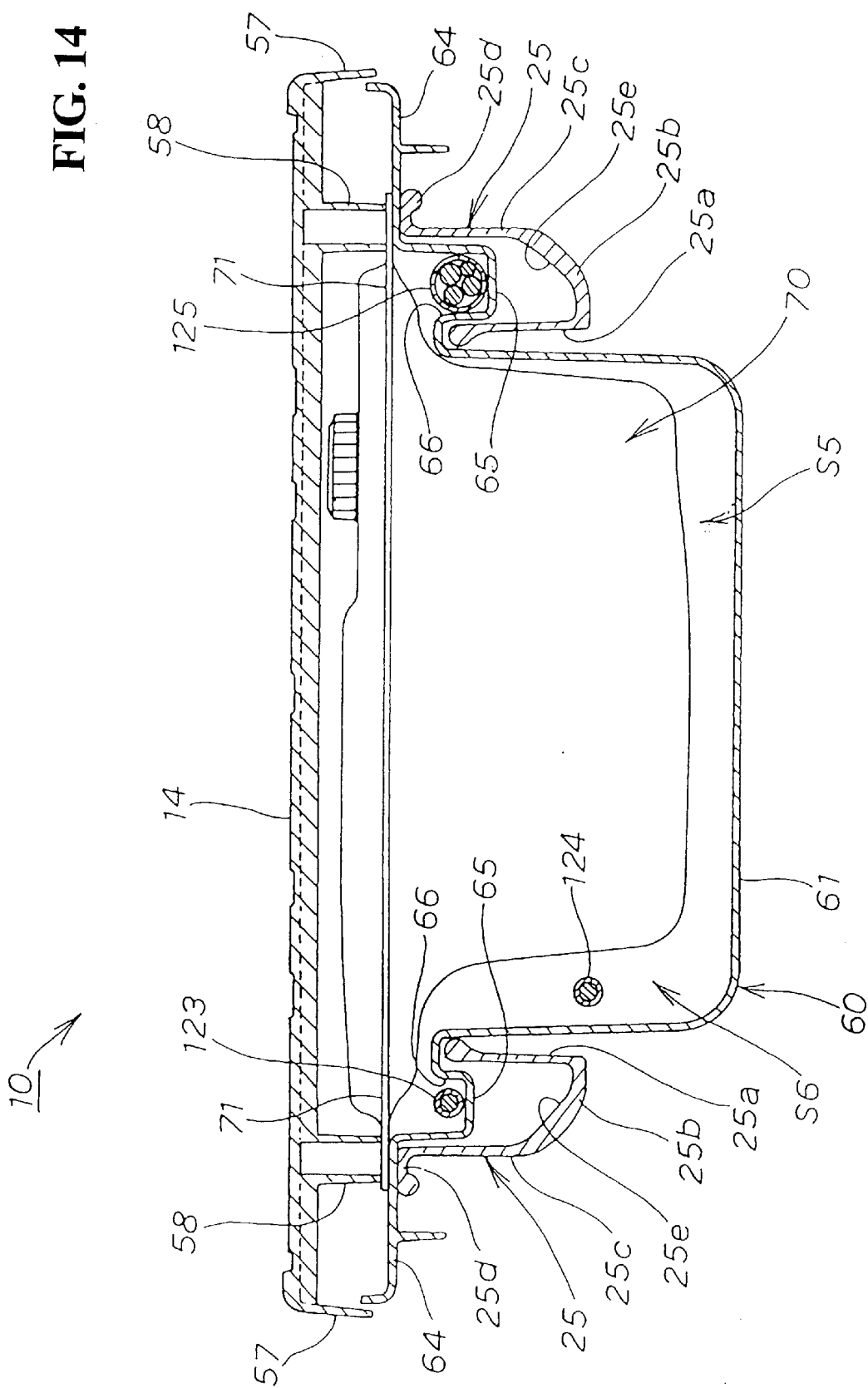
FIG. 14 is a cross sectional view taken along the line 14—14 in FIG. 12.

FIG. 14 is a cross sectional view taken along the line 14—14 in FIG. 12, showing a state in which the bosses 58 are extended from the lower surface of the step floor 14 toward the edges 71, 71 of the fuel tank 70. The bosses 58 may prevent the edges 64, 64 of the undercover 60 or the edges 71, 71 of the fuel tank 70 from rising above.

Figure 15:
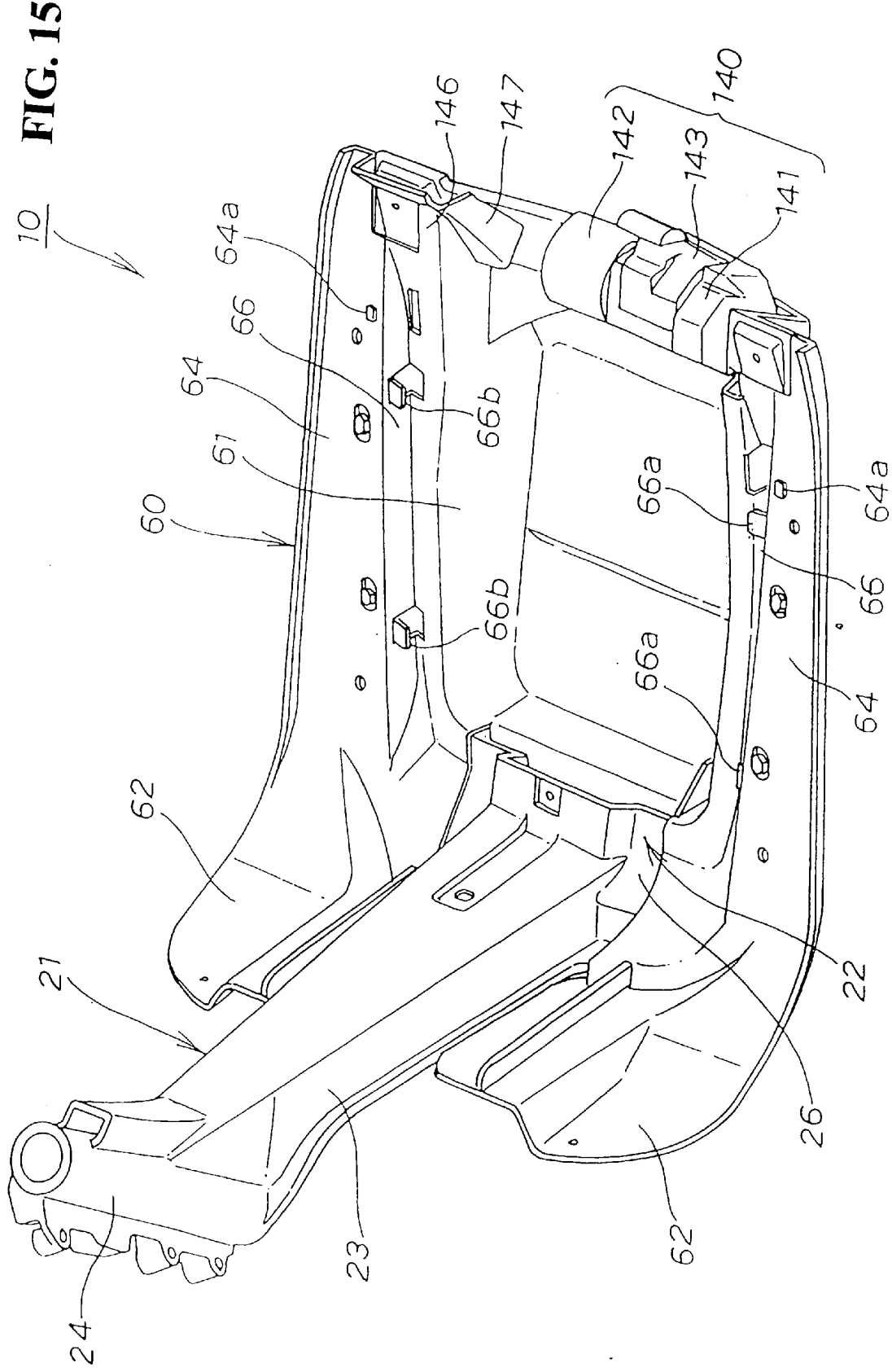
FIG. 15 is a perspective view showing a mounting structure of the front frame and the undercover according to an embodiment of the present invention.
Figure 16:
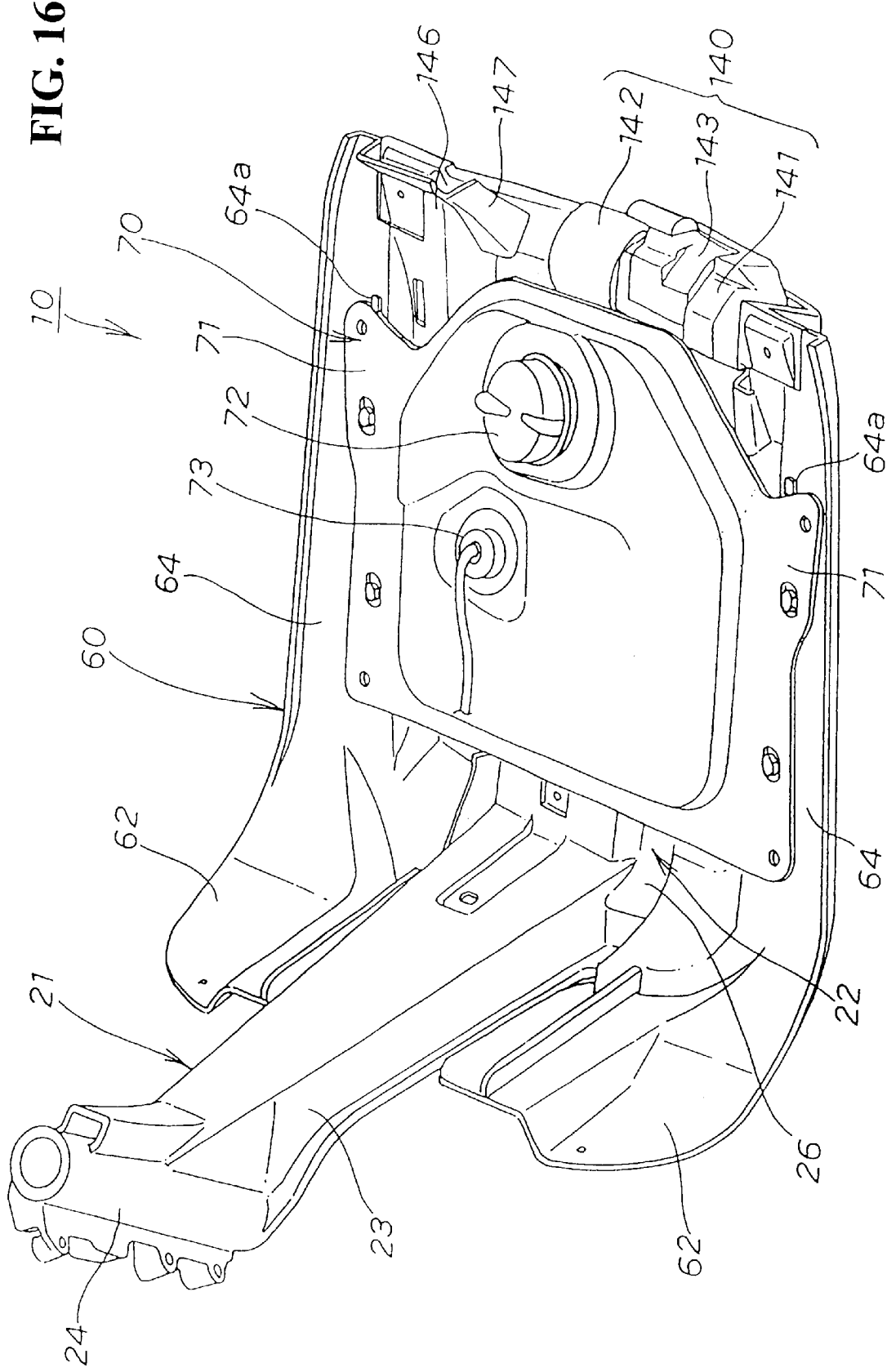
FIG. 16 is a perspective view showing a mounting structure of the front frame, the undercover, and the fuel tank according to an embodiment of the present invention.

FIG. 15 is a perspective view showing the mounting structure of the front frame and the undercover, showing a state in which the undercover 60 is superposed on the front frame 21. One of skill in the art will appreciate that some parts have been omitted from the figure in the interest of clarity. FIG. 16 is a perspective view showing the mounting structure of the front frame, the undercover, and the fuel tank according to the present invention, showing a state in which the undercover 60 and the fuel tank 70 are superposed on the front frame 21. One of skill in the art will appreciate that some parts have been omitted from the figure in the interest of clarity.

The left and right positioning projections 64a, 64a are provided at the position above the edges 64, 64 of the undercover 60, and the fuel tank 70 is placed thereon in such a manner that the rear ends of the edges 71, 71 thereof abut against these positioning projections 64a, 64a, so that the fuel tank 70 may be positioned with respect to the undercover 60 in the fore-and-aft direction. A fuel level gauge 73 is also shown.

Figure 17:
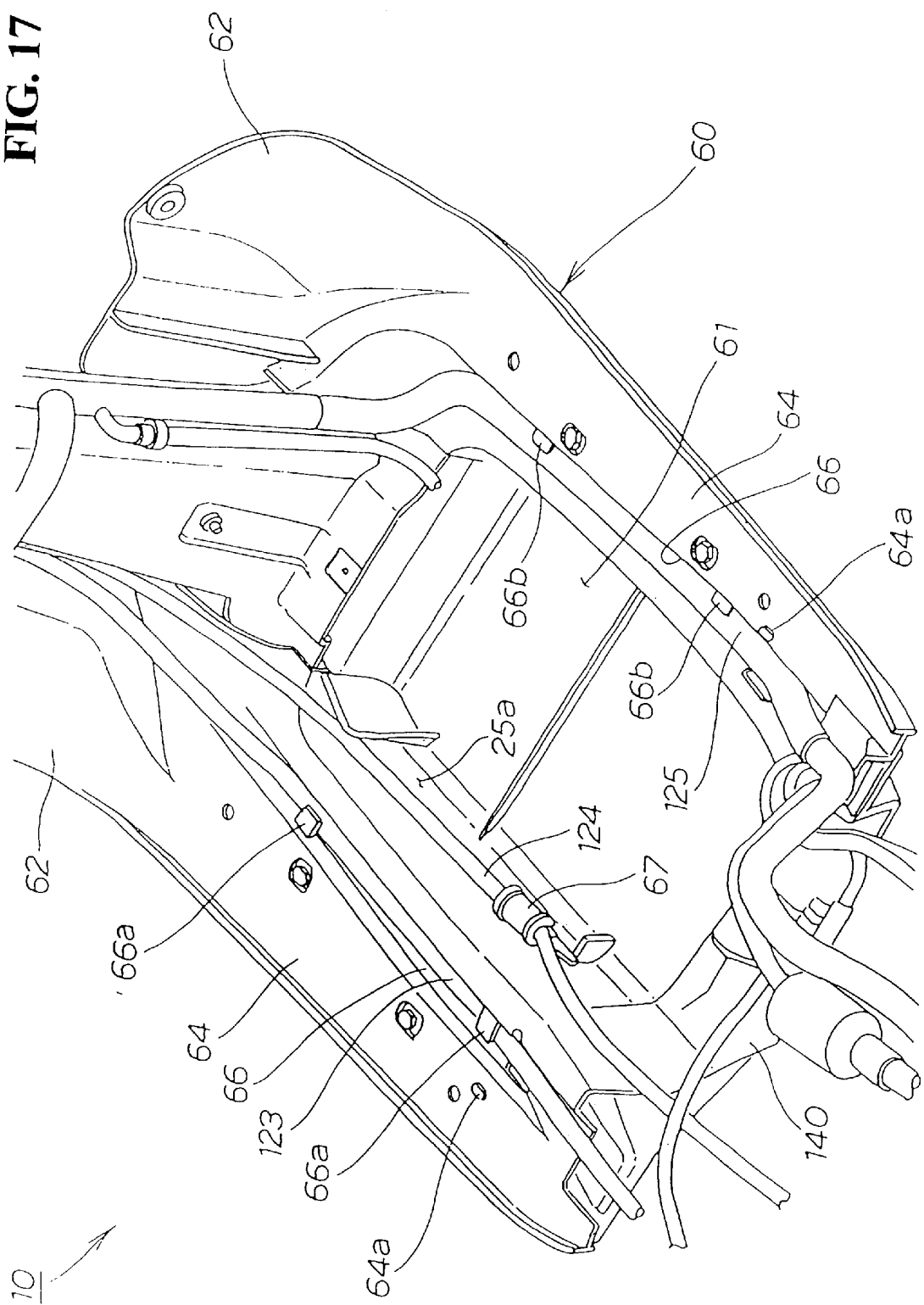
FIG. 17 is a drawing showing the relation between the undercover and the linear member according to an embodiment of the present invention.

FIG. 17 is a side view showing the relation between the undercover and the linear member according to the present invention, when the undercover 60 is viewed from an upper right position. This figure shows the undercover 60 in a state in which (1) a throttle cable 123 is passed through the recess 66 on the left side and the throttle cable 123 is prevented from rising by means of guiding strips 66a projected from the recess 66. (2) A wire harness 125 is passed through the recess 66 on the right side and the wire harness 125 is prevented from rising by means of guiding strips 66b projected from the recess 66. (3) A rear brake cable 124 passed along the inner uprising wall 25a on the left side is held by a damper 67 provided on the inner uprising wall 25a.

Returning back to FIG. 13 for description, since the linear control member such as the throttle cable 123, the wire harness 125, electrical cable and the like is passed through the recesses 66, 66 on the swelled portions 65, 65, the linear member may easily be passed between the step floor 14 and the undercover 60 while ensuring the volume of the space S5 surrounded by the step floor 14 and the undercover 60.

In addition, the guiding section for guiding the linear members 123, 125, or the recesses 66, 66 may easily be provided between the step floor 14 and the undercover 60. Therefore, since the linear members 123, 125 may be guided over a sufficient length by means of the recesses 66, 66, these linear members 123, 125 may easily be laid in place without allowing friction between other members such as the vehicle body frame 20 (See FIG. 1) or the like.

Figure 18:
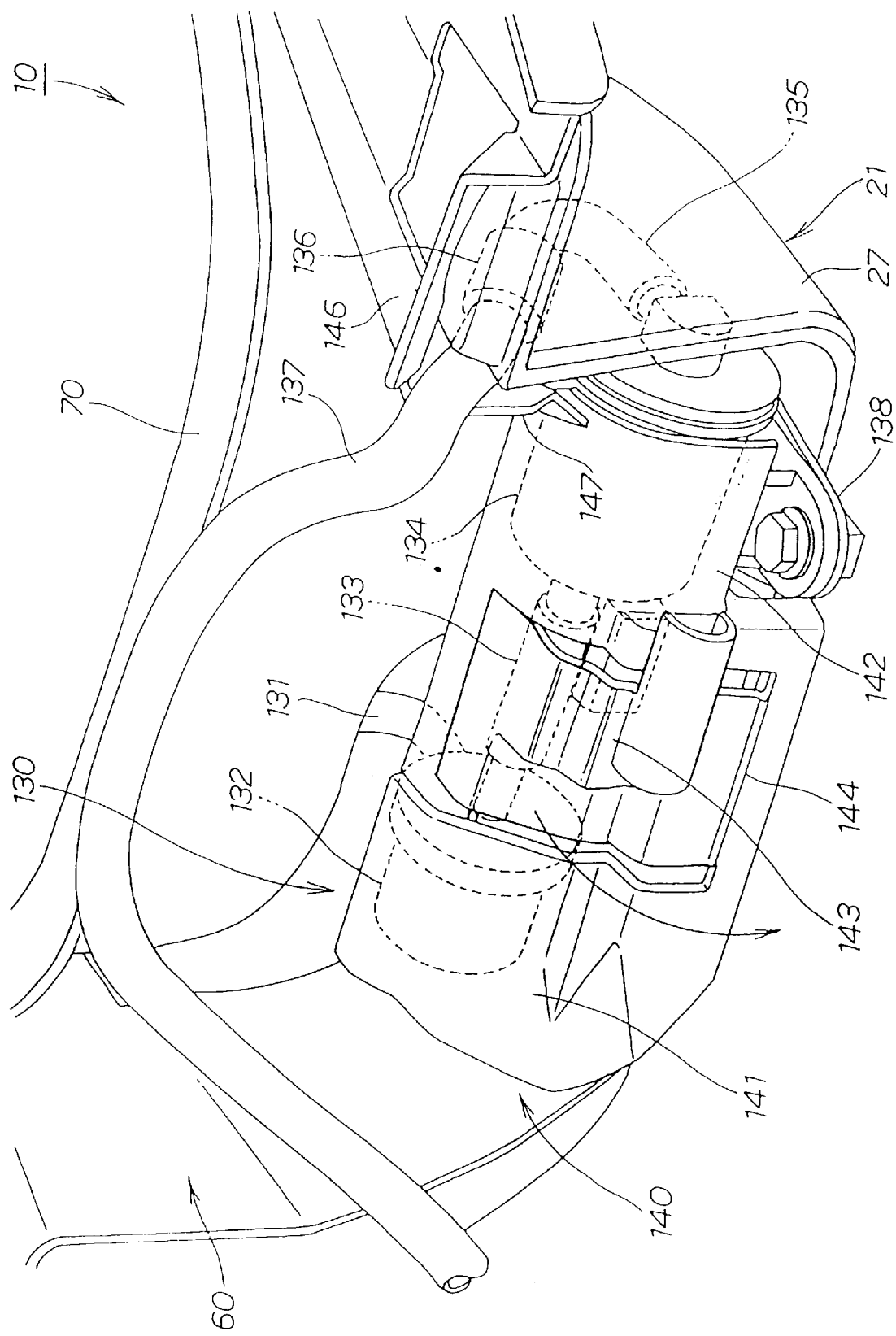
FIG. 18 is a perspective view of a mounting structure of the front frame, the undercover, and the fuel system according to an embodiment of the present invention.

FIG. 18 is a perspective view of the mounting structure of the front frame, the undercover, and the fuel system according to the present invention when the fuel system 130 is viewed from the upper rear position. A fuel filter 132 is disposed on the left side of the vehicle body, a fuel pump 134 is disposed on the right side of the vehicle body, a check valve (nonreturn valve) 136 is disposed on the upper right of the fuel pump 134, and the fuel pump 134 is mounted on the rear cross member 27 of the front frame 21 via a stay 138.

The fuel system 130 is constructed in such a manner that the inlet of the fuel filter 132 is connected to the outlet 74 (See FIG. 12) of the fuel tank 70 via a hose 131. The suction port of the fuel pump 134 is connected to the outlet of the fuel filter 132 via a hose 133, the inlet of the check valve 136 is connected to the discharge port of the fuel pump 134 via a hose 135, and the outlet of the check valve 136 is connected to the engine fuel injection system, not shown, via a hose 137.

A heat shielding plate 140 is formed integrally with the undercover 60 of resin material, including a left shielding portion 141 for covering around the fuel filter 132, a right shielding portion 142 of covering around the fuel pump 134, and a central shielding portion 143 positioned between the left and right shielding portions 141, 142. The lower end of the central shielding portion 143 is a thin hinge 144 formed integrally with the undercover 60. Therefore, the central shielding portion 143 can be opened and closed in the fore-and-aft direction about the hinge 144. Maintenance and inspection of the connecting portion between the fuel filter 132 and the fuel pump 134 may be performed by opening the central shielding portion 143 as illustrated by the arrow.

Figure 19:
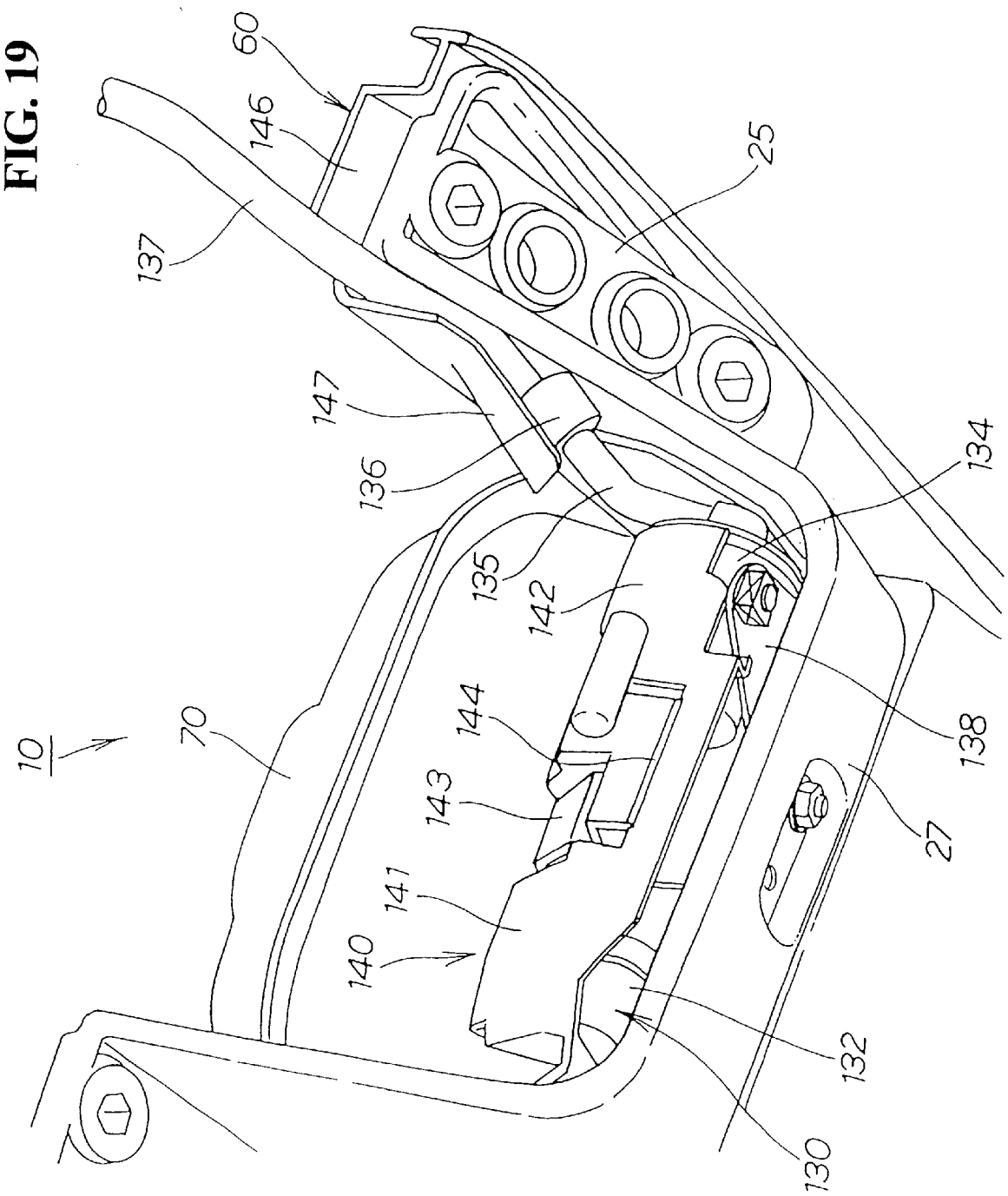
FIG. 19 is a perspective view showing the mounting structure of the front frame, the undercover, and the fuel system according to an embodiment of the present invention.

FIG. 19 is a perspective view showing a mounting structure of the front frame, the undercover, and the fuel system according to the present invention when the fuel system 130 is viewed from a rear, lower left position. A heat shielding portion 147 for covering the check valve 136 is extended from the portion 146 of the undercover 60 which covers the right side frame 25.

In the embodiments of the present invention described thus far, the scooter type vehicle 10 is not limited to a scooter type motorcycle, and it may be for example a moped, motorcycle, three-wheeled vehicle, e.g. a motor-trike, or a scooter type quadricycle or other multi-wheeled vehicle. The container to be accommodated in the undercover 60 is not limited to the fuel tank 70, and may be various containers such as a dough box for accommodating a battery or an electrical component, or a radiator reserve tank.

The present invention in the construction described above has the following advantages. The undercover may be positioned with respect to the left and right side frames easily by fitting the swelled portion provided on the edge of the undercover into the open-top groove formed on the left and right side frames. Therefore, assembling property may further be enhanced. In addition, no additional positioning member is required. A linear member may easily be passed between the step floor and the undercover while ensuring the volume of the space surrounded by the step floor and the undercover.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scooter type vehicle having a vehicle body, said vehicle comprising:

an engine having at least one cylinder;

a front and a rear wheel;

a pair of left and right side frames extending in a longitudinal direction of the vehicle body;

a container having an upper side and a lower side and being disposed between said pair of left and right side frames;

an undercover having edges, said undercover covering said lower side of said container and being inserted between the left and right side frames from a position above said container, wherein said edges of said undercover are engaged with said left and right side frames;

a footrest plate covering said upper side of said container, said left and right side frames supporting said undercover; and an edge of said container engaging said footrest plate, said container being sandwiched between said undercover and said footrest plate.

2. The scooter type vehicle according to claim 1, wherein said container is a fuel tank.

3. The scooter type vehicle according to claim 1, wherein said container is a dough box.

4. The scooter type vehicle according to claim 1, further comprising:

an opened portion being formed on a rear portion of the step floor and passing vertically therethrough; and a lid for the an oil/fuel filler port for opening and closing the opened portion on the step floor.

5. The scooter type vehicle according to claim 2, further comprising:

an opened portion being formed on a rear portion of the step floor and passing vertically therethrough; and a lid for the an oil/fuel filler port for opening and closing the opened portion on the step floor.

6. The scooter type vehicle according to claim 1, further comprising a fuel system, said fuel system including a fuel filter and a fuel pump being disposed at a position near the cylinder of the engine, said fuel system being disposed within a space enclosed by the undercover and the step floor.

7. The scooter type vehicle according to claim 2, further comprising a fuel system, said fuel system including a fuel filter and a fuel pump being disposed at a position near the cylinder of the engine, said fuel system being disposed within a space enclosed by the undercover and the step floor.

8. The scooter type vehicle according to claim 5, further comprising a fuel system, said fuel system including a fuel filter and a fuel pump being disposed at a position near the cylinder of the engine, said fuel system being disposed within a space enclosed by the undercover and the step floor.

9. The scooter type vehicle according to claim 1, the undercover further including integrally formed, horizontally extending edges with respect to the vehicle body, a pair of U-shaped swelled portions extending in the longitudinal direction and integrally formed with the edges 64, 64, and open-top elongated recesses extending in the fore-and-aft direction and formed on the pair of U-shaped swelled portions.

10. The scooter type vehicle according to claim 9, further including at least one linear control member passing through said recesses.

11. The scooter type vehicle according to claim 10, wherein said liner control member includes at least one of a brake cable, a throttle cable, wire harness, or electrical cable.

12. The scooter type vehicle according to claim 1, further comprising a set of nuts and bolts, said set of nuts of bolts commonly fastening said undercover, said container and said floor plate to said left and right side frames.

13. The scooter type vehicle according to claim 5, the undercover further including integrally formed, horizontally extending edges with respect to the vehicle body, a pair of U-shaped swelled portions extending in the longitudinal direction and integrally formed with the edges, and open-top elongated recesses extending in the fore-and-aft direction and formed on the pair of U-shaped swelled portions.

14. The scooter type vehicle according to claim 13, further including at least one linear control member passing through said recesses.

15. A vehicle frame for a scooter type vehicle, said vehicle frame comprising:

a pair of left and right side frames extending in a longitudinal direction of the vehicle frame;

a container having an upper side and a lower side and being disposed between said pair of left and right side frames;

an undercover having edges, said undercover covering said lower side of said container and being inserted between the left and right side frames from a position above said container, wherein said edges of said undercover are engaged with said left and right side frames;

a footrest plate covering said upper side of said container, said left and right side frames supporting said undercover; and an edge of said container engaging said footrest plate, said container being sandwiched between said undercover and said footrest plate.

16. The vehicle frame according to claim 15, the undercover further including integrally formed, horizontally extending edges with respect to the vehicle body, a pair of U-shaped swelled portions extending in the longitudinal direction and integrally formed with the edges, and open-top elongated recesses extending in the fore-and-aft direction and formed on the pair of U-shaped swelled portions.

17. The vehicle frame according to claim 16, further including at least one linear control member passing through said recesses.

18. The vehicle frame according to claim 16, further including a heat shielding member extending from said undercover.

* * * * *